United States Patent
Sasaki et al.

(10) Patent No.: US 12,299,788 B2
(45) Date of Patent: May 13, 2025

(54) TOOL SYSTEM, TOOL, METHOD FOR GENERATING REFERENCE IMAGE, AND PROGRAM

(71) Applicant: Panasonic Intellectual Property Management Co., Ltd., Osaka (JP)

(72) Inventors: Ryosuke Sasaki, Osaka (JP); Mutsuhiro Yamanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 333 days.

(21) Appl. No.: 17/923,823

(22) PCT Filed: Apr. 12, 2021

(86) PCT No.: PCT/JP2021/015138
§ 371 (c)(1),
(2) Date: Nov. 7, 2022

(87) PCT Pub. No.: WO2021/229972
PCT Pub. Date: Nov. 18, 2021

(65) Prior Publication Data
US 2023/0177753 A1   Jun. 8, 2023

(30) Foreign Application Priority Data
May 15, 2020 (JP) ................. 2020-086342

(51) Int. Cl.
*G06T 11/60* (2006.01)
*B25B 21/00* (2006.01)
(Continued)

(52) U.S. Cl.
CPC .............. *G06T 11/60* (2013.01); *B25B 21/00* (2013.01); *G06F 3/14* (2013.01); *G06V 10/242* (2022.01); *G06V 10/761* (2022.01)

(58) Field of Classification Search
CPC .... G06T 11/60; G06V 10/761; G06V 10/242; G06F 3/14; B25B 21/00; B25B 28/00
See application file for complete search history.

(56) References Cited

U.S. PATENT DOCUMENTS

2002/0038159 A1* 3/2002 Gass .................. G05B 19/4183
                                                            700/108
2008/0079836 A1* 4/2008 Nagata ................. H04N 23/663
                                                            348/E5.025
(Continued)

FOREIGN PATENT DOCUMENTS

JP       2008-009868 A      1/2008
JP       2016-038716 A      3/2016
(Continued)

OTHER PUBLICATIONS

Extended European Search Report dated Jul. 27, 2023 issued in the corresponding European Patent Application No. 21804824.7.
(Continued)

*Primary Examiner* — King Y Poon
*Assistant Examiner* — Vincent Peren
(74) *Attorney, Agent, or Firm* — Rimon P.C.

(57) ABSTRACT

A tool system is used for a plurality of tools. Each of the plurality of tools is a portable tool and includes: a driving unit to be activated with power supplied from a power source; and an image capturing unit. The tool system includes a reference image generating unit and an output unit. The reference image generating unit generates, based on a second captured image, a reference image to be compared with a first captured image. The first captured image is shot, while a current work target is being identified, by the image capturing unit. The second captured image is also shot by the image capturing unit. The output unit makes a display unit display the second captured image while the (Continued)

reference image generating unit is generating the reference image.

14 Claims, 7 Drawing Sheets

(51) Int. Cl.
*G06F 3/14* (2006.01)
*G06V 10/24* (2022.01)
*G06V 10/74* (2022.01)

(56) References Cited

U.S. PATENT DOCUMENTS

| | | | |
|---|---|---|---|
| 2015/0122520 A1* | 5/2015 | Rola | G05B 19/12 173/1 |
| 2017/0197302 A1* | 7/2017 | Kobayashi | G06T 7/0008 |
| 2019/0294138 A1 | 9/2019 | Dobashi et al. | |
| 2019/0362480 A1* | 11/2019 | Diao | G06T 7/10 |
| 2021/0056682 A1* | 2/2021 | Ward | G06N 20/00 |
| 2021/0101263 A1* | 4/2021 | Hwang | B25B 21/002 |
| 2021/0241469 A1* | 8/2021 | Alessandrini | G06V 30/19133 |
| 2022/0189185 A1* | 6/2022 | Wyss | G06F 18/214 |
| 2022/0221834 A1* | 7/2022 | Dobashi | G05B 19/4183 |
| 2022/0277439 A1* | 9/2022 | Ikeda | G06T 7/70 |

FOREIGN PATENT DOCUMENTS

| | | |
|---|---|---|
| JP | 2018-108633 A | 7/2018 |
| JP | 2019-042860 A | 3/2019 |
| JP | 2019-144965 A | 8/2019 |

OTHER PUBLICATIONS

International Search Report dated Jun. 15, 2021 issued in International Patent Application No. PCT/JP2021/015138, with English translation.

* cited by examiner

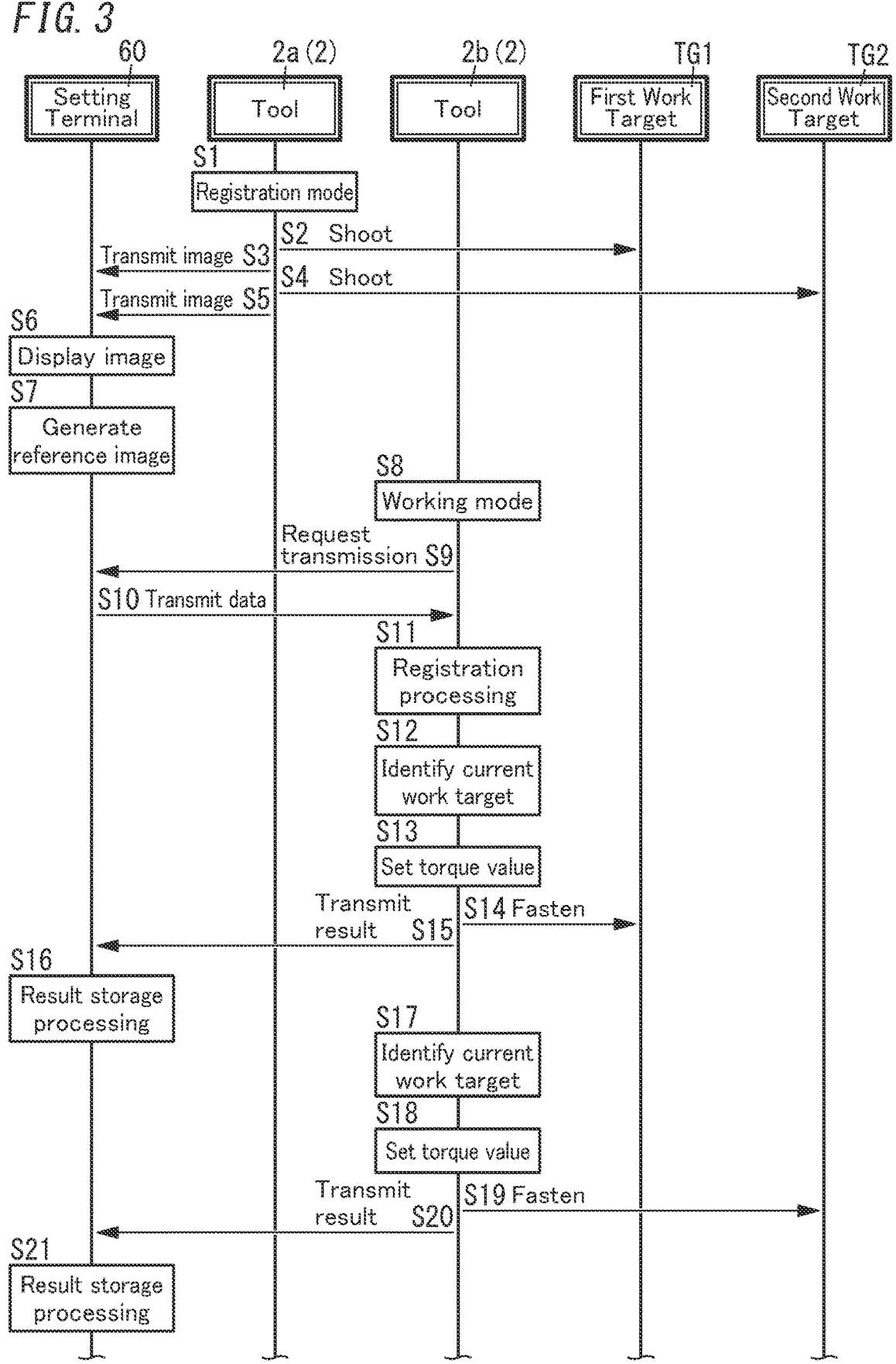

TOOL SYSTEM, TOOL, METHOD FOR GENERATING REFERENCE IMAGE, AND PROGRAM

CROSS-REFERENCE OF RELATED APPLICATIONS

This application is the U.S. National Phase under 35 U.S.C. § 371 of International Patent Application No. PCT/JP2021/015138, filed on Apr. 12, 2021, which in turn claims the benefit of Japanese Patent Application No. 2020-086342, filed on May 15, 2020, the entire disclosures of which Applications are incorporated by reference herein.

TECHNICAL FIELD

The present disclosure generally relates to a tool system, a tool, a method for generating a reference image, and a program. More particularly, the present disclosure relates to a tool system for use in a portable tool, a portable tool, a method for generating a reference image for use in the tool system, and a program.

BACKGROUND ART

Patent Literature 1 discloses a tool system including a portable tool having a driving unit to be activated with power supplied from a battery pack and an image capturing unit. The image capturing unit is arranged to cover, for example, a socket, attached to an output shaft of the tool, within its image capturing range. The image capturing unit captures an image of a work target (which may be, for example, an object or a place on which work is conducted using the tool) while the work is conducted using the tool.

According to Patent Literature 1, the image captured by the image capturing unit is used to identify a current work target on which the tool is set in place (i.e., the work target that has been arranged to make the tool ready to start working on the work target). The tool system of Patent Literature 1 includes an identification unit. The identification unit compares a captured image generated by the image capturing unit with a plurality of reference images stored in an image storage unit and thereby identifies the current work target. In addition, according to Patent Literature 1, when finding the current work target, identified by the identification unit, not conforming to a reference working procedure in terms of a working process step for the work target, the tool system performs processing of deactivating the driving unit, for example.

CITATION LIST

Patent Literature

Patent Literature 1: JP 2018-108633 A

SUMMARY OF INVENTION

It is preferable that the tool system of Patent Literature 1 use, as the reference image, an image suitable for identifying the current work target.

In view of the foregoing background, it is therefore an object of the present disclosure to provide a tool system, a tool, a method for generating a reference image, and a program, all of which are configured or designed to use, as a reference image, an image suitable for identifying the current work target.

To overcome the problem, a tool system according to an aspect of the present disclosure is used for a plurality of tools. Each of the plurality of tools is a portable tool and includes: a driving unit to be activated with power supplied from a power source; and an image capturing unit. The tool system includes a reference image generating unit. The reference image generating unit generates a reference image to be compared with a first captured image. The first captured image is shot, while a current work target, on which a first tool that is one of the plurality of tools is currently set in place, is being identified among a plurality of work targets, by the image capturing unit of the first tool that is currently set in place among the plurality of tools. The reference image generating unit generates the reference image based on a second captured image. The second captured image is to be shot by the image capturing unit of a second tool that is one of the plurality of tools. The tool system further includes an output unit. The output unit makes a display unit display the second captured image while the reference image generating unit is generating the reference image.

A tool according to another aspect of the present disclosure is to be used in the tool system described above and includes the driving unit and the image capturing unit.

A method for generating a reference image according to still another aspect of the present disclosure includes a reference image generating step. The reference image generating step includes generating, based on a second captured image, a reference image to be compared with a first captured image. The first captured image is shot, while a current work target, on which a first tool that is one of a plurality of tools is currently set in place, is being identified, by an image capturing unit of the first tool that is currently set in place among the plurality of tools. Each of the plurality of tools is a portable tool and includes: a driving unit to be activated with power supplied from a power source; and the image capturing unit. The second captured image is shot by the image capturing unit of a second tool that is one of the plurality of tools. The reference image generating step further includes a display step. The display step includes making a display unit display the second captured image while the reference image is being generated.

A program according to yet another aspect of the present disclosure is designed to cause one or more processors to perform the method for generating the reference image described above.

A tool system according to yet another aspect of the present disclosure includes a plurality of tools, a reference image generating unit, and an output unit. Each of the plurality of tools is a portable tool and includes: a driving unit to be activated with power supplied from a power source; and an image capturing unit. The reference image generating unit generates a reference image to be compared with a first captured image. The first captured image is shot, while a current work target, on which a first tool that is one of the plurality of tools is currently set in place, is being identified among a plurality of work targets, by the image capturing unit of the first tool that is currently set in place among the plurality of tools. The reference image generating unit generates the reference image based on a second captured image. The second captured image is shot by the image capturing unit of a second tool that is one of the plurality of tools. The output unit makes a display unit display the second captured image while the reference image generating unit is generating the reference image.

BRIEF DESCRIPTION OF DRAWINGS

FIG. 3 shows the sequence of operations to be performed by the tool system;

DESCRIPTION OF EMBODIMENTS

Figure 1:
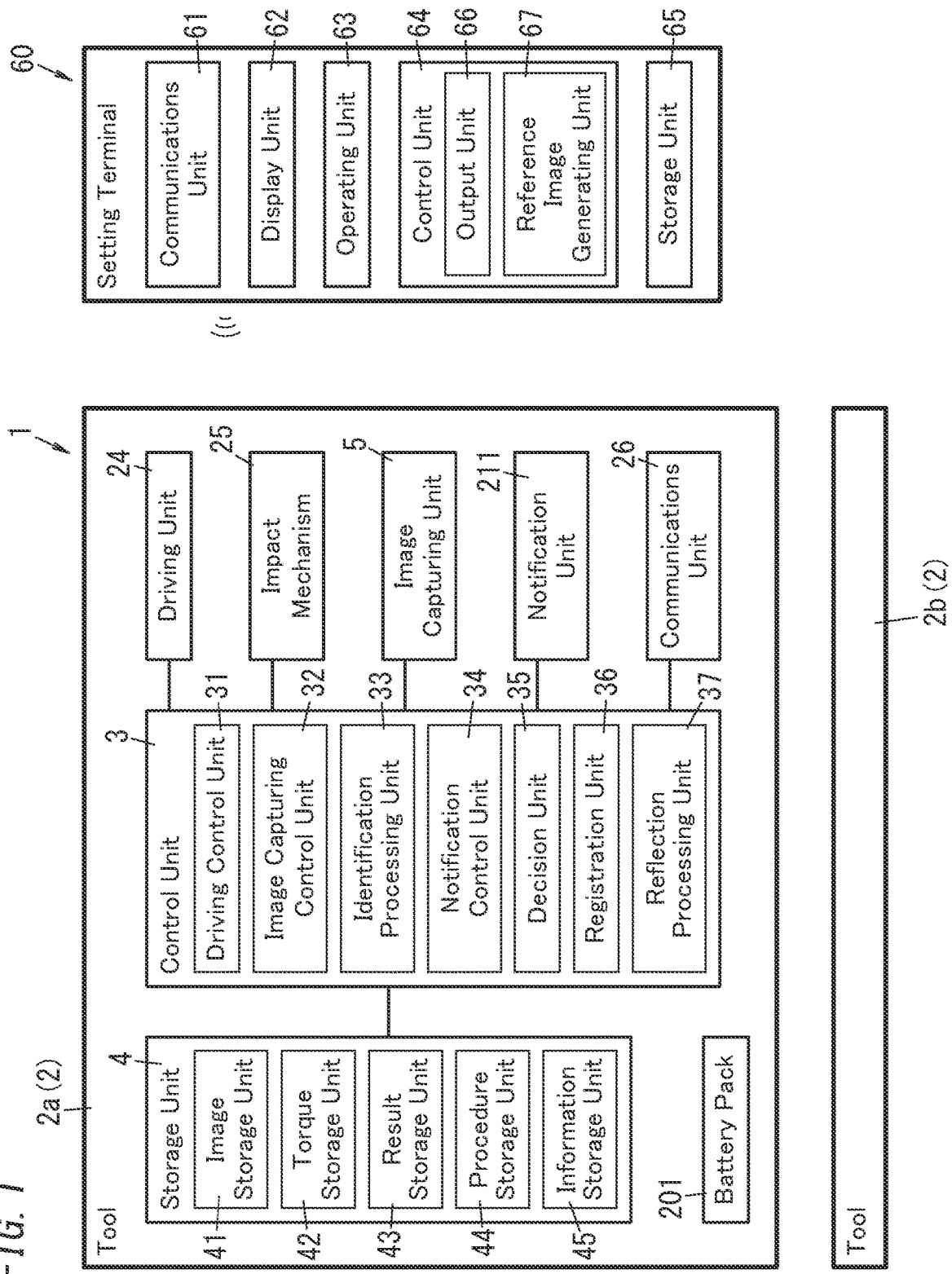
FIG. 1 is a block diagram of a tool system according to an exemplary embodiment.

A preferred embodiment of the present disclosure will now be described in detail with reference to the accompanying drawings. In the following description of embodiments, any pair of constituent elements, having the same function, will be designated by the same reference numeral and description thereof will be omitted herein to avoid redundancy.

EMBODIMENT

(1) Overview

First, an overview of a tool system 1 according to an exemplary embodiment will be described with reference to FIG. 1.

A tool system 1 according to this embodiment includes a plurality of (e.g., two in the example shown in FIG. 1) portable tools 2a, 2b. In the following description, when there is no need to distinguish these two tools 2a, 2b from each other, the tools 2a, 2b will be hereinafter collectively referred to as "tools 2." Each tool 2 includes a driving unit 24 including a motor, for example. The driving unit 24 is activated with motive power (such as electric power) supplied from a power source such as a battery pack 201. Examples of the tools 2 of this type include an impact wrench, a nut runner, an oil pulse wrench, a screwdriver (including an impact screwdriver), a drill, a drill-screwdriver, and various other types of tools. Using a tool 2 of this type allows the user to perform various types of machining work such as attaching a fastening member (such as a bolt or a nut) onto a workpiece (target of machining work) as a work target or opening a hole through the workpiece.

In addition, in this embodiment, an image capturing unit 5 is provided for each of the two tools 2a, 2b. The image capturing unit 5 generates a captured image. The image capturing unit 5 covers, in its image capturing range (field of view), a socket 242 (refer to FIG. 2A) attached to an output shaft 241 (refer to FIG. 2A) of the tool 2, for example. Thus, while the user is performing work using the tool 2, the image capturing unit 5 captures an image of the work target and generates a captured image.

When operating in a working mode (to be described later), the tool system 1 according to this embodiment identifies, based on a captured image (first captured image) shot by the image capturing unit 5, a current work target that is a work target, on which the tool 2 is currently set in place, among a plurality of work targets. The tool system 1 may determine, by identifying the current work target, whether the work being performed by the user using the tool 2 follows the predetermined working procedure, for example. Using the first captured image obtained by the image capturing unit 5 provided for the tool 2 enables, for example, providing support for, or managing, the user's work using the tool 2.

The tool system 1 according to this embodiment includes not only the tools 2 but also a display unit 62, a reference image generating unit 67, and an output unit 66 as well as shown in FIG. 1.

The reference image generating unit 67 generates, based on the captured image (second captured image) shot by the image capturing unit 5 of the tool 2, a reference image corresponding to the work target in the working mode (to be described later).

The output unit 66 makes, while the reference image generating unit 67 is generating the reference image, the display unit 62 display the second captured image shot by the image capturing unit 5.

According to this configuration, while the reference image generating unit 67 is generating the reference image based on the second captured image, the output unit 66 makes the display unit 62 display the second captured image. This allows the user, for example, of the tool system 1 to check the second captured image displayed on the display unit 62 while the reference image is being generated by the reference image generating unit 67. Thus, the tool system 1 according to this embodiment may use, as the reference image, an image that is more suitable for identifying the current work target.

(2) Detailed Configuration

Next, a detailed configuration for the tool system 1 according to this embodiment will be described with reference to FIGS. 1-2B.

(2.1) Premise

The tool system 1 according to this embodiment may be used, for example, in an assembly line for performing assembling work on products at a factory. In particular, in this embodiment, each of the tools 2a, 2b included in the tool system 1 is supposed to be a fastening tool such as an impact wrench for use to tighten a fastening member (such as a bolt or a nut). Specifically, this embodiment is supposed to be applied to a situation where a single workpiece has a plurality of portions to be fastened, thus requiring the user to attach a fastening member onto each of those portions to be fastened by using at least one of the two tools 2a, 2b in a single workplace.

As used herein, the "portion to be fastened" refers to a part of a workpiece (target of machining work), to which the fastening member is attached. For example, if the fastening member is a bolt, then the portion to be fastened is an area surrounding, and covering, a screw hole to which the fastening member is attached. That is to say, in this embodiment, a single workpiece has a plurality of such portions to be fastened.

As used herein, the "work target" refers to an object or a working area on which work is supposed to be performed by using the tool 2. In particular, a work target on which the tool 2 is currently set in place will be hereinafter sometimes referred to as a "current work target." As used herein, the phrase "the tool 2 is currently set in place" refers to a situation where the tool 2 has been placed so as to be ready to perform work on the work target. Also, as used herein, the phrase "placed so as to be ready to perform work" refers to not only a situation where the tool 2 is already in contact with the work target but also a situation where the tool 2 is on the verge of being brought into contact with the work target. That is to say, when the tool 2 is currently set in place on the work target, the tool 2 may be already in contact with the work target or may be still out of contact with the work target. In this embodiment, each of the plurality of portions to be fastened of a single workpiece is supposed to be the work target as an example.

As used herein, the "captured image" refers to an image captured by the image capturing unit 5 and includes a still picture (still image) and a moving picture (motion picture). The "moving picture" further includes a group of still pictures captured by stop-motion shooting, for example. The captured image does not have to be output data itself provided by the image capturing unit 5. For example, the captured image may have been subjected, as needed, to data compression, conversion into another data format, cropping an image part from the image captured by the image capturing unit 5, focus adjustment, brightness adjustment, contrast adjustment, or any of various other types of image processing. In this embodiment, the captured image is supposed to be, for example, an image generated by shooting the workpiece with the image capturing unit 5 provided for the tool 2 in a state where the tool 2 is currently set in place on the work target. In this embodiment, the captured image is supposed to be a full-color moving picture, for example.

Also, as used herein, the "first captured image" refers to a captured image shot by the image capturing unit 5 while the user is performing work using the tool 2. On the other hand, the "second captured image" refers to a captured image shot by the image capturing unit 5 while a reference image corresponding to the work target is being generated.

Furthermore, as used herein, the "reference image" refers to an image generated based on the second captured image shot by the image capturing unit 5. The "reference image" may include a plurality of frames corresponding to either a single work target or plurality of work targets. In this embodiment, the frame is supposed to be a full-color still picture as an example. As used herein, the "plurality of frames corresponding to either a single work target or a plurality of work targets" refers to not only a situation where the plurality of frames correspond one to one to the plurality of work targets but also a situation where the plurality of frames correspond one to multiple to either a single work target or a plurality of work targets.

Also, as used herein, if something is "provided for" something else, then the former may be built in (e.g., integrated inseparably with) the latter or may be just attached as an external member to the latter (e.g., removably secured with a coupler, for example).

Furthermore, as used herein, the "working procedure" means the procedure of the work to be performed using the tool 2. For example, if a series of working process steps to be performed on either a single work target or a plurality of work targets is defined to be a single working process, then the working procedure indicates the order in which the working process steps are supposed to be performed on the single work target or the plurality of work targets through the working process. More specifically, if the instruction on the work to be done on a single work target is a "working instruction," then the working procedure is information indicating either a single working instruction or a plurality of working instructions for the single working process along with the order in which the working process steps are supposed to be performed. In other words, the working procedure indicates which of the single or plurality of working processes the work target corresponds to and also indicates the place in the corresponding working process. In the following description of this embodiment, the working procedure is supposed to define in which order the work (including a plurality of working process steps) should be performed on a plurality of work targets in a single workpiece.

(2.2) Configuration for Tool

First, a configuration for a tool 2 (2a, 2b) in the tool system 1 according to this embodiment will be described with reference to FIGS. 1, 2A, and 2B. The two tools 2a, 2a according to this embodiment each have the same configuration.

The tool 2 according to this embodiment is used in the tool system 1 and includes a driving unit 24 and the image capturing unit 5. In particular, in this embodiment, the tool 2 is supposed to be an impact wrench that activates the driving unit 24 by using electrical energy. Such a tool 2 may be used to perform fastening work of attaching a fastening member onto a work target. The tool 2 further includes an impact mechanism 25 in addition to the driving unit 24.

In this case, the tool 2 is designed to activate the driving unit 24 with the electric power (electrical energy) supplied from a battery pack 201 by using the battery pack 201 as a power source. In this embodiment, the battery pack 201 is supposed to be counted among the constituent elements of the tool 2. However, the battery pack 201 does not have to be one of the constituent elements of the tool 2. In other words, the battery pack 201 may be counted out of the constituent elements of the tool 2.

The tool 2 further includes a body 20. In the body 20, housed are the driving unit 24 and the impact mechanism 25. In addition, the image capturing unit 5, the control unit 3, a storage unit 4, a notification unit 211, and a communications unit 26, which are included in the tool system 1, are also housed in the body 20.

The body 20 of the tool 2 includes a barrel 21, a grip 22, and an attachment 23. The barrel 21 is formed in a cylindrical shape (e.g., circular cylindrical shape in this embodiment). The grip 22 protrudes along a normal to a part of the circumferential surface of the barrel 21 (i.e., along the radius of the barrel 21). To the attachment 23, the battery pack 201 is attached removably. In this embodiment, the attachment 23 is provided at the tip of the grip 22. In other words, the barrel 21 and the attachment 23 are coupled together via the grip 22.

At least the driving unit 24 is housed in the barrel 21. The driving unit 24 includes a motor. The driving unit 24 is configured to be activated with the power supplied from the battery pack 201 as a power source to the motor. An output shaft 241 protrudes from one axial end surface of the barrel 21. The output shaft 241 turns around a rotational axis Ax1, which is aligned with the direction in which the output shaft 241 protrudes, as the driving unit 24 is activated. That is to say, the driving unit 24 drives the output shaft 241 in rotation around the rotational axis Ax1. In other words, as the driving unit 24 is activated, torque is applied to the output shaft 241, thereby causing the output shaft 241 to turn.

A cylindrical socket 242 for rotating a fastening member (such as a bolt or a nut) is attached removably onto the output shaft 241. The socket 242 turns along with the output shaft 241 around the rotational axis Ax1. The size of the socket 242 attached to the output shaft 241 may be selected as appropriate by the user according to the size of the fastening member. According to such a configuration, activating the driving unit 24 causes the output shaft 241 to turn, thus causing the socket 242 to rotate along with the output shaft 241. If the socket 242 is fitted onto a fastening member at this time, then the fastening member turns along with the socket 242, thus having the work of tightening or loosening the fastening member done. In this manner, the tool 2 may have the work of tightening or loosening the fastening member done by activating the driving unit 24.

Optionally, a socket anvil may also be attached, instead of the socket 242, onto the output shaft 241. The socket anvil is also attached removably to the output shaft 241. This allows a bit (such as a screwdriver bit or a drill bit) to be attached to the output shaft 241 via the socket anvil.

The tool 2 includes the impact mechanism 25 as described above. The impact mechanism 25 is configured to, when (the work value of) fastening torque exceeds a predetermined level, apply impacting force in the rotational direction of the output shaft 241. This allows the tool 2 to apply greater fastening torque to the fastening member.

The grip 22 is a portion to be gripped by the user while he or she is performing the work. The grip 22 is provided with a trigger switch 221 and a forward/reverse switch 222. The trigger switch 221 is a switch for controlling the ON/OFF states of the operation performed by the driving unit 24 and allows adjusting a rotational velocity of the output shaft 241 according to how deep the trigger switch 221 is pulled. The forward/reverse switch 222 is a switch for switching the rotational direction of the output shaft 241 from the clockwise direction to the counterclockwise direction, and vice versa.

The attachment 23 is formed in the shape of a compressed rectangular parallelepiped. The battery pack 201 is attached removably to one side, opposite from the grip 22, of the attachment 23.

The battery pack 201 includes a case 202 made of a resin and formed in a rectangular parallelepiped shape. The case 202 houses a rechargeable battery (such as a lithium-ion battery) inside. The battery pack 201 supplies electric power to the driving unit 24, the control unit 3, the image capturing unit 5, the communications unit 26, the notification unit 211, and other constituent members.

The attachment 23 is also provided with an operating panel 231. The operating panel 231 may include a plurality of press button switches 232 and a plurality of LEDs (light-emitting diodes) 233, for example. The operating panel 231 allows the user to enter various types of settings for, and confirm the state of, the tool 2. That is to say, by operating the press button switches 232 of the operating panel 231, the user is allowed to change the operation mode of the tool 2 or the check the remaining capacity of the battery pack 201, for example.

The attachment 23 further includes a light-emitting unit 234. The light-emitting unit 234 includes an LED, for example. The light-emitting unit 234 emits light toward the work target while the user is performing work using the tool 2. The light-emitting unit 234 may be turned ON and OFF by operating the operating panel 231. Alternatively, the light-emitting unit 234 may also be lit automatically when the trigger switch 221 turns ON.

(2.3) Overall Configuration for Tool System

Next, an overall configuration for the tool system 1 according to this embodiment will be described with reference to FIG. 1.

The tool system 1 includes the portable tools 2 as described above. In addition, in this embodiment, the tool system 1 further includes a setting terminal 60.

(2.3.1) Tool

First, a configuration for the tools 2 will be described with reference to FIGS. 1, 2A, and 2B. In this case, each of the tools 2 according to this embodiment has, as its operation modes, at least a working mode and a registration mode. As used herein, the "working mode" refers to an operation mode in which the user performs work using the tool 2. The registration mode refers herein to an operation mode in which a reference image corresponding to the work target is generated. The operation mode may be switched by, for example, operating the operating panel 231. Alternatively, the operation mode may also be switched by operating another member, such as a dip switch, provided separately from the operating panel 231.

The image capturing unit 5, the control unit 3, the storage unit 4, the notification unit 211, and the communications unit 26 are housed in the body 20 of the tool 2. In this embodiment, the image capturing unit 5 and the notification unit 211 may be housed in the barrel 21, for example. The control unit 3, the storage unit 4, and the communications unit 26 may be housed in either the grip 22 or the attachment 23.

The image capturing unit 5 is provided for the tool 2 and generates data as a captured image. The image capturing unit 5 may be a camera including an image sensor and a lens, for example. In this embodiment, the image capturing unit 5 may be housed in (the barrel 21 of) the body 20 of the tool 2. The image capturing unit 5 is provided to be oriented toward the tip of the output shaft 241 to capture an image of the work target while the user is performing the work using the tool 2.

Figure 2A:
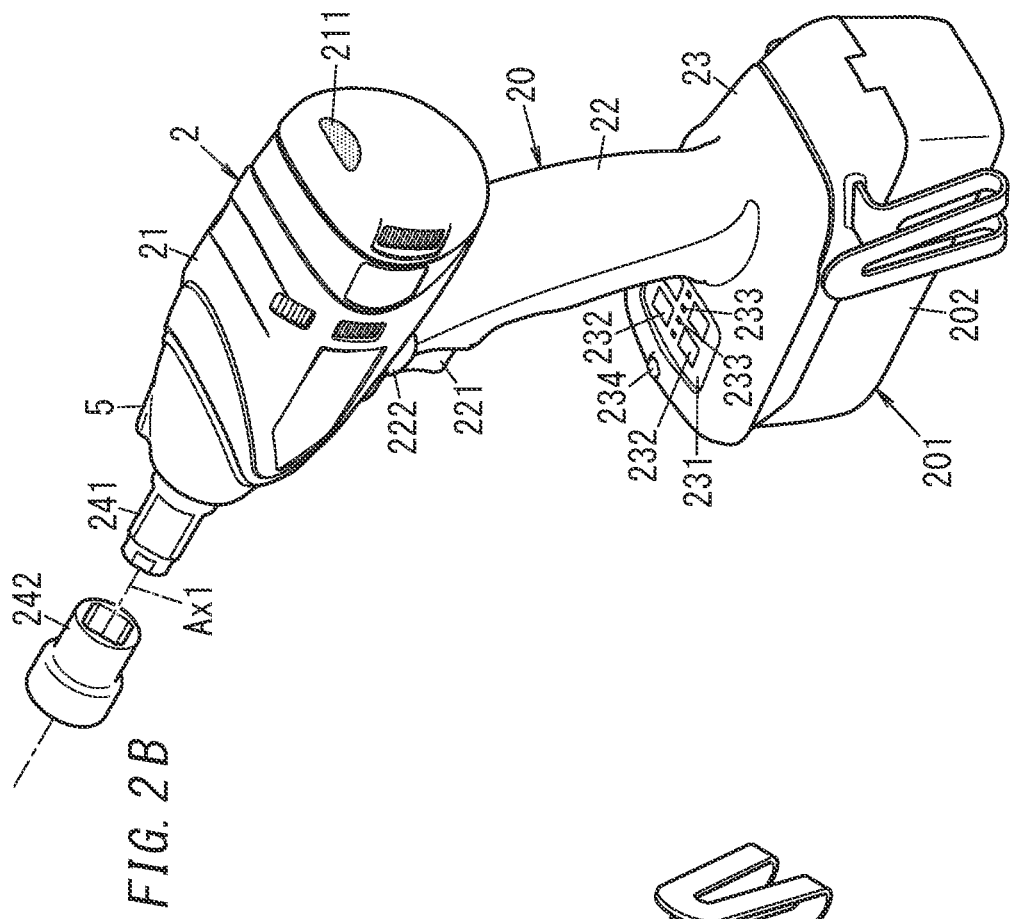
FIG. 2A is a perspective view illustrating the appearance, as viewed from one angle, of a tool included in the tool system.
Figure 2B:
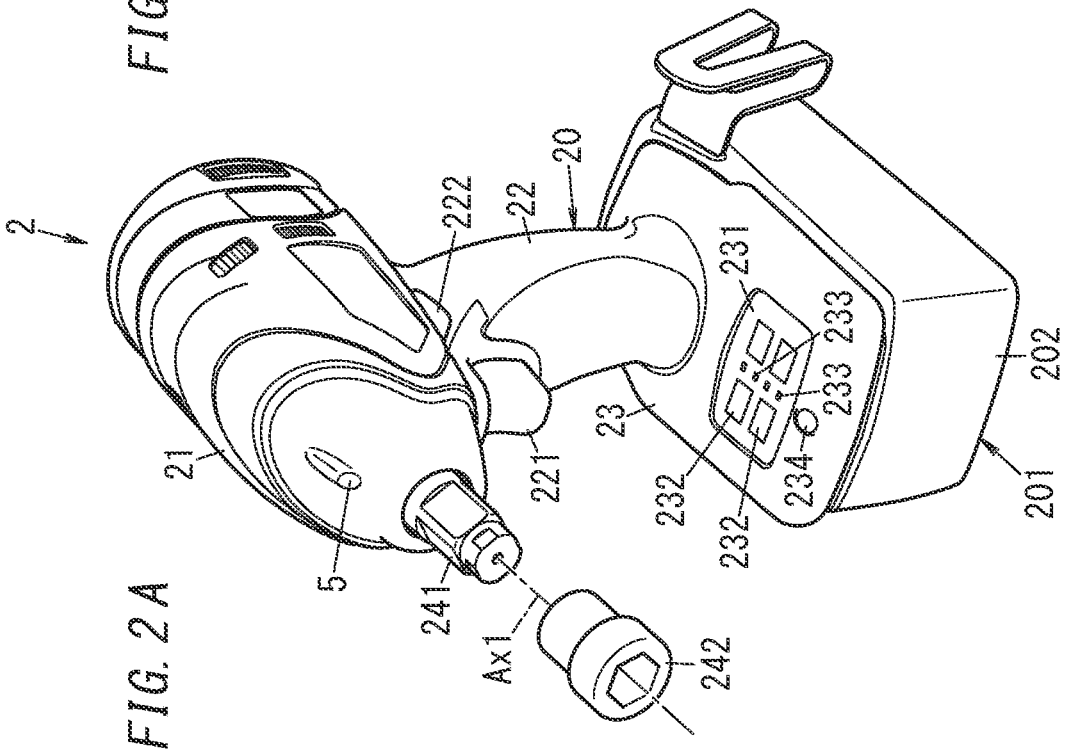
FIG. 2B is a perspective view illustrating the appearance, as viewed from another angle, of the tool included in the tool system.

Specifically, the image capturing unit 5 is provided in a tip portion of the barrel 21 to be oriented toward the tip of the output shaft 241 (i.e., toward the socket 242) such that the socket 242 attached to the output shaft 241 falls within the image capturing range (refer to FIGS. 2A and 2B). The optical axis of the image capturing unit 5 is arranged to be aligned with the rotational axis Ax1 of the output shaft 241. In this embodiment, the image capturing unit 5 is arranged such that the optical axis thereof is located within a predetermined distance from the rotational axis Ax1 of the output shaft 241 and that the rotational axis Ax1 and the optical axis are substantially parallel to each other. Note that the image capturing unit 5 does not have to generate the captured image such that the socket 242 attached to the output shaft 241 falls within the image capturing range thereof. Rather the image capturing unit 5 only needs to generate a captured image for identifying the current work target. As used herein, the "captured image for identifying the current work target" refers to an image generated when the workpiece in a state where the tool 2 is currently set in place on the work target is shot by the image capturing unit 5. The captured image has only to be an image that allows the user to identify the current work target. Thus, the work target on which the tool 2 is currently set in place may or may not be covered within the image capturing range of the captured image.

While the tool 2 is operating in the working mode, the image capturing unit 5 generates a first captured image. The first captured image according to this embodiment is an image generated when the workpiece is shot by the image capturing unit 5 provided for the tool 2 in a state where the tool 2 operating in the working mode is currently set in place on the work target. The work target on which the tool 2 is currently set in place may or may not be covered within the image capturing range of the first captured image. While the tool 2 is operating in the working mode, the image capturing unit 5 outputs the first captured image as time series data to the identification processing unit 33 of the control unit 3.

On the other hand, while the tool 2 is operating in the registration mode, the image capturing unit 5 generates a second captured image. The second captured image according to this embodiment is an image generated when the workpiece is shot by the image capturing unit 5 provided for the tool 2 in a state where the tool 2 operating in the registration mode is currently set in place on the work target. The work target on which the tool 2 is currently set in place may or may not be covered within the image capturing range of the second captured image. While the tool 2 is operating in the registration mode, the image capturing unit 5 outputs the second captured image as time series data to the communications unit 26 to make the communications unit 26 transmit the second captured image to the setting terminal 60.

The notification unit 211 may be implemented as an LED, for example. The notification unit 211 may be provided for the other end, opposite from the output shaft 241, of the barrel 21 of the body 20 to be easily viewed by the user during the work (refer to FIG. 2B).

The communications unit 26 adopts a wireless communications protocol compliant with a standard such as Wi-Fi®, Bluetooth®, ZigBee®, or a low power radio standard requiring no licenses (e.g., the Specified Low Power Radio standard). In this embodiment, the communications unit 26 communicates wirelessly with the setting terminal 60. Alternatively, the communications unit 26 may communicate with the setting terminal 60 by wired communication method as well.

The control unit 3 may include, as a major constituent element thereof, a microcontroller including one or more processors and one or more memories, for example. The microcontroller performs the function of the control unit 3 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause one or more processors to function as the control unit 3.

The control unit 3 performs the functions of a driving control unit 31, an image capturing control unit 32, the identification processing unit 33, a notification control unit 34, a decision unit 35, a registration unit 36, and a reflection processing unit 37, for example. Note that if no operating command is entered into the trigger switch 221 or the operating panel 231 for a certain period of time, the control unit 3 enters a sleep mode. The control unit 3 is activated when any operating command is entered, during the sleep mode, into either the trigger switch 221 or the operating panel 231.

The driving control unit 31 controls the driving unit 24. Specifically, the driving control unit 31 activates the driving unit 24 to make the output shaft 241 turn at the rotational velocity determined by the press depth of the trigger switch 221 and in a rotational direction set by the forward/reverse switch 222.

The driving control unit 31 also controls the driving unit 24 such that the fastening torque becomes equal to a torque setting (working setting). The driving control unit 31 has a torque estimating function of estimating the magnitude of the fastening torque. In this embodiment, the driving control unit 31 estimates, until the estimated value of the fastening torque reaches a seating determination level, the magnitude of the fastening torque based on a rotational velocity or any other parameter of the driving unit 24 (motor). When the estimated value of the fastening torque reaches the seating determination level, the driving control unit 31 estimates the magnitude of the fastening torque based on the number of strokes by the impact mechanism 25. When finding the number of stokes by the impact mechanism 25 has reached a threshold number of times based on the torque setting, the driving control unit 31 determines that the fastening torque should have reached a torque setting, and stops running the driving unit 24 (i.e., the motor). This allows the tool 2 to fasten the fastening member with fastening torque that exactly matches the torque setting.

The image capturing control unit 32 is a processing unit for controlling the image capturing unit 5 to make the image capturing unit 5 generate a first captured image and a second captured image.

The identification processing unit 33 identifies a current work target, shot in the first captured image, out of a plurality of work targets by performing image processing of comparing the first captured image generated by the image capturing unit 5 with the reference image. In this embodiment, the reference image is stored in the storage unit 4 (image storage unit 41).

Specifically, the identification processing unit 33 performs, on the first captured image, pattern recognition processing using, as template data, a reference image including a plurality of frames corresponding to the plurality of work targets, thereby identifying the current work target. That is to say, the identification processing unit 33 identifies the current work target shot in the first captured image by comparing the first capture image with the reference image including a plurality of frames corresponding to the plurality of work targets.

The identification processing unit 33 identifies the current work target by performing, on a frame basis, image processing (pattern recognition processing) on the data output, in a moving picture format (i.e., first captured image), from the image capturing unit 5, for example.

As used herein, the "pattern recognition processing" refers to image processing for recognizing, based on the shape of an object shot in an image, what the object shot in the image is. Examples of the pattern recognition processing of this type include pattern matching processing and processing of recognizing an object shot in an image by using a learned model created by machine learning. The pattern matching as used herein refers to the processing of using the template data described above to compare the template data with a target (such as the first captured image). Also, any appropriate algorithm may be used in the method for machine learning. For example, a deep learning algorithm may be adopted. Furthermore, if the work target thus identified does not conform to a working instruction defined by the working procedure, then the identification processing unit 33 performs at least one of placing a restriction on the operation of the driving unit 24 or making notification. In other words, the identification processing unit 33 determines whether or not the work target identified by the identification processing unit 33 (i.e., the current work target) conforms to a working instruction defined by the preset working procedure. That is to say, the identification processing unit 33 determines whether or not the work target identified by the identification processing unit 33 agrees with the work target specified by the working instruction included in the working procedure.

Specifically, the identification processing unit 33 extracts data of a working procedure associated with the current work target from a procedure storage unit 44 of the storage unit 4. Then, the identification processing unit 33 determines whether or not the work target, subjected to the current working instruction defined by the working procedure that has been extracted from the procedure storage unit 44, agrees with the work target identified. If these work targets agree with each other, the identification processing unit 33 decides that the work target identified should conform to the working instruction defined by the working procedure. On the other hand, if these work targets disagree with each other, the identification processing unit 33 decides that the work target identified should not conform to the working instruction defined by the working procedure.

When deciding, as a result of such determination, that the work target thus identified should not conform to the working instruction defined by the working procedure, the identification processing unit 33 performs at least one of placing a restriction on the operation of the driving unit 24 or making notification. As used herein, the "notification" includes not only notifying the user but also notifying an external terminal (such as a mobile communications device), for example.

Specifically, when deciding that the work target thus identified should not conform to the working instruction defined by the working procedure, the identification processing unit 33 does not allow the driving unit 24 to be activated even if the trigger switch 221 is pulled. That is to say, the driving unit 24 is allowed to be activated only when the identification processing unit 33 decides that the work target thus identified should conform to the working instruction defined by the working procedure. Thus, even if the tool 2 is currently set in place on a work target that does not conform to the working procedure, the driving unit 24 remains deactivated, thus prohibiting fastening work from being performed. This may reduce the chances of the work being performed in a wrong working procedure. Optionally, when deciding that the work target thus identified should not conform to the working instruction defined by the working procedure, the identification processing unit 33 may lock the trigger switch 221 to prevent the user from pulling the trigger switch 221 in such a situation.

In addition, when deciding that the work target thus identified should not conform to the working instruction defined by the working procedure, the identification processing unit 33 makes the notification control unit 34 activate the notification unit 211. Thus, the notification unit 211 serves as a user notification unit for notifying the user that the tool 2 is now set in place on a work target that does not conform to the working procedure.

That is to say, the identification processing unit 33 performs, as predetermined processing based on the first captured image, at least target identification processing of identifying the current work target. In other words, the identification processing unit 33 performs at least identification of the current work target as (predetermined) processing. In addition, the identification processing unit 33 further performs, as predetermined processing based on the first captured image, procedure determination processing of comparing the work target thus identified with the working instruction defined by the working procedure and thereby determining their correspondence. In other words, the identification processing unit 33 performs, as (predetermined) processing, determination of the correspondence between the work target thus identified and the working instruction defined by the working procedure. If the result of the procedure determination processing reveals that the work target does not conform to the working instruction, then the identification processing unit 33 places a restriction on the operation of the driving unit 24 and/or makes notification.

The notification control unit 34 controls the notification unit 211 provided for the tool 2. The notification control unit 34 preferably lights the notification unit 211 differently in a situation where the decision made by the identification processing unit 33 is disagreement from in a situation where the decision made by the identification processing unit 33 is agreement. For example, if the decision made by the identification processing unit 33 is disagreement, the notification control unit 34 may light the notification unit 211 in red. On the other hand, if the decision made by the identification processing unit 33 is agreement, then the notification control unit 34 may light the notification unit 211 in green. This allows the user to recognize, by checking the lighting state of the notification unit 211 with the eye, whether or not the work target conforms to the working procedure. Optionally, when the trigger switch 221 is pulled in a state where the decision made by the identification processing unit 33 is disagreement, the notification control unit 34 may light the notification unit 211.

The decision unit 35 is configured to determine whether or not the fastening torque is a normal one when the fastening member is attached to the portion to be fastened. In this case, the decision unit 35 preferably determines, in accordance with the working instruction defined by the working procedure, whether or not the fastening torque is a normal one. Specifically, the working instruction defined by the working procedure includes a target torque value associated with the work target. This allows the decision unit 35 to determine, by comparing the target torque value included in the working instruction with the fastening torque, whether or not the work is being performed with the fastening torque specified by the working instruction.

If the driving control unit 31 has deactivated the driving unit 24 on detecting that the number of strokes by the impact mechanism 25 has reached the threshold number of times, for example, then the decision unit 35 decides that the fastening torque should be normal. On the other hand, if the driving control unit 31 has deactivated the driving unit 24 by turning the trigger switch 221 OFF before the number of strokes by the impact mechanism 25 reaches the threshold number of times, for example, then the decision unit 35 decides that the fastening torque should be insufficient (abnormal). The decision unit 35 also performs result storage processing of storing the decision results in the result storage unit 43 in association with the portion to be fastened.

The registration unit 36 performs image registration processing, torque registration processing, and information registration processing. The image registration processing is the processing of making the image storage unit 41 of the storage unit 4 store a reference image including a plurality of frames corresponding to the plurality of work targets. The torque registration processing is the processing of making the torque storage unit 42 of the storage unit 4 store a plurality of target torque values. The information registration processing is the processing of storing, in the information storage unit 45 of the storage unit 4, information about the specifics of the predetermined image processing performed by the reference image generating unit 67 when generating the reference image.

The registration unit 36 makes, when performing the image registration processing, the image storage unit 41 store a reference image for each work target, provided by the setting terminal 60, for example, in association with the work target. In this case, the registration unit 36 may make the image storage unit 41 store either a single reference image or two or more reference images for a single work target.

The registration unit 36 regards, when performing the torque registration processing, a torque value provided for each work target by the setting terminal 60 as a target torque value, for example, and makes the torque storage unit 42 store the target torque value in association with the work target.

The registration unit 36 makes, when performing the information registration processing, the information storage unit 45 store information, which has been entered through the setting terminal 60, for example, about the specifics of the predetermined image processing that the reference image generating unit 67 performed when generating the reference image, in association with the reference image and the working procedure. In the following description, such information about the specifics of the predetermined image processing will be hereinafter referred to as "processing information." Examples of the processing information include information about the luminance adjustment that the reference image generating unit 67 performed when generating the reference image. The "information about the luminance adjustment" includes, for example, information indicating which area was subjected to the luminance adjustment in the reference image and information indicating how much the luminance value of the second captured image has been adjusted.

The reflection processing unit 37 has the information about the predetermined image processing that the reference image generating unit 67 performed when generating the reference image (i.e., the processing information) reflected on the control of the image capturing unit 5. The reflection processing unit 37 adjusts, in accordance with the processing information, the exposure time, the F number, and other parameters when the image capturing unit 5 generates the captured image. For example, if the reference image generating unit 67 made luminance adjustment to decrease the luminance of the overall reference image when generating the reference image, then the reflection processing unit 37 makes adjustment to shorten the exposure time to decrease the luminance of the first captured image shot by the image capturing unit 5.

The storage unit 4 may be implemented as a semiconductor memory, for example, and performs the function of the image storage unit 41, the torque storage unit 42 (target value storage unit), the result storage unit 43, the procedure storage unit 44, and the information storage unit 45. In this embodiment, the image storage unit 41, the torque storage unit 42, the result storage unit 43, the procedure storage unit 44, and the information storage unit 45 are implemented as a single memory. However, this is only an example and should not be construed as limiting. Alternatively, these storage units 41, 42, 43, 44, and 45 may also be implemented as a plurality of memories. Still alternatively, the storage unit 4 may also be implemented as a storage medium such as a memory card attachable to, and removable from, the tool 2.

The image storage unit 41 stores the reference image including a plurality of frames in association with the plurality of work targets. In the image storage unit 41, a single reference image frame may be stored in association with a single work target. Alternatively, a plurality of reference image frames obtained by shooting a single work target from various angles or in multiple different sizes may be stored there in association with the single work target.

The torque storage unit 42 stores a plurality of target torque values (target values) in association with the plurality of work targets one to one. As used herein, the "target torque value" refers to the target value of fastening torque when a fastening member is attached to an associated work target.

The result storage unit 43 stores the decision results obtained by the decision unit 35 with respect to a plurality of portions to be fastened in association with the plurality of work targets. It is recommended that the result storage unit 43 store the decision results obtained by the decision unit 35 with time stamps, indicating the working times, added thereto. This allows the work target decision results to be distinguished from one workpiece to another on the assembly line.

The procedure storage unit 44 stores data about either a single working procedure or a plurality of working procedures. As described above, the working procedure means the procedure in which work is supposed to be performed using the tool 2 and may be, for example, data defining in which order the work should be performed on a plurality of work targets of a single workpiece.

The information storage unit 45 stores the processing information in association with the reference image and the working procedure.

(2.3.2) Setting Terminal

Next, a configuration for the setting terminal 60 will be described.

The setting terminal 60 may be a mobile telecommunications device such as a smartphone or a tablet computer, for example, and includes a communications unit 61, a display unit 62, an operating unit 63, a control unit 64, and a storage unit 65.

The communications unit 61 adopts a wireless communications protocol compliant with a standard such as Wi-Fi®, Bluetooth®, ZigBee®, or a low power radio standard requiring no licenses (such as the Specified Low Power Radio standard). In this embodiment, the communications unit 61 communicates wirelessly with the communications unit 26 of the tool 2. However, this is only an example and should not be construed as limiting. Alternatively, the communications unit 61 may also communicate with the communications unit 26 of the tool 2 by wired communication method, instead of the communication by wireless communication method.

The display unit 62 and the operating unit 63 may be implemented integrally as a touchscreen panel display, for example.

The control unit 64 may include, as a major constituent element thereof, a microcontroller including one or more processors and one or more memories, for example. The microcontroller performs the function of the control unit 64 by making the one or more processors execute a program stored in the one or more memories. The program may be stored in advance in the memory. Alternatively, the program may also be distributed after having been stored in a non-transitory storage medium such as a memory card or downloaded via a telecommunications line. In other words, the program is designed to cause the one or more processors to function as the control unit 64.

The control unit 64 is configured to control the communications unit 61, the display unit 62, and the operating unit 63. In addition, the control unit 64 also performs the functions of the output unit 66 and the reference image generating unit 67.

The reference image generating unit 67 generates a reference image including a plurality of frames corresponding to either a single work target or a plurality of work targets. The reference image generating unit 67 generates the reference image including the plurality of frames based on a second captured image shot by the image capturing unit 5 of the tool 2. More specifically, the reference image generating unit 67 generates the reference image by performing predetermined image processing on the second captured image. Optionally, the reference image generating unit 67 may change the specifics of the predetermined image processing on a frame-by-frame basis when generating the reference image including the plurality of frames.

As used herein, the "predetermined image processing" refers to image processing including, for example, cropping, masking, and luminance adjustment. The "cropping" process as used herein refers to specifying a part of the reference image (second captured image) as a cropping area. The "cropping area" is an area to be compared with an area that forms part of the first captured image while the identification processing unit 33 of the tool 2 is identifying the current work target. In this case, once the cropping area has been specified for a reference image, the rest of the reference image, other than the part falling within the cropping area, is not to be compared with the first captured image. The "masking" process as used herein refers to specifying a part of the reference image (second captured image) as a masking area. The "masking area" is an area not to be compared with the first captured image while the identification processing unit 33 of the tool 2 is identifying the current work target. In this case, once the masking area has been specified for a reference image, the rest of the reference image, other than the part falling within the masking area, is to be compared with the first captured image. The "luminance adjustment" as used herein refers to adjustment for increasing or decreasing the luminance of at least a part of the reference image (second captured image). The luminance adjustment is performed as appropriate according to the environment surrounding the work target when the second captured image is shot. The luminance adjustment may be performed, for example, in a situation where the workpiece on which the user is performing assembling work is irradiated with light coming from a lighting fixture, for example, thus causing a so-called "blown out highlights" phenomenon that at least part of the reference image has a saturated luminance value. Performing the image processing including cropping, masking, and luminance adjustment allows using, as the reference image, an image that is more suitable for identifying the current work target.

Note that the reference image generating unit 67 may generate either a single reference image frame or a plurality of reference image frames in association with a single work target. The reference image generation processing to be performed by the reference image generating unit 67 will be described in detail later in the "(3.3) Reference image generation processing" section.

The output unit 66 makes the display unit 62 display the second captured image while the reference image generating unit 67 is generating the reference image. The output unit 66 according to this embodiment makes the display unit 62 display the second captured image received by the communications unit 61. In the tool system 1 according to this embodiment, the tool 2a and the display unit 62 are provided separately from each other. This allows the tool system 1 according to this embodiment to have the second captured image displayed while reducing the size of the tool 2a.

The storage unit 65 may be implemented as a semiconductor memory such as a flash memory. The storage unit 65 stores the reference image generated by the reference image generating unit 67.

(3) Operation

Next, an exemplary operation of the tool system 1 according to this embodiment will be described with reference to FIGS. 3-7.

In the following description, it will be described as an example how the tool system 1 operates while the user is performing assembling work on a workpiece in an assembly line. Also, in the example to be described below, the workpiece on which the user performs the assembling work has two work targets and the user performs the work of attaching fastening members onto the two work targets by using the tool 2. Furthermore, in the following description, the tool system 1 generates a reference image based on a second captured image shot by the image capturing unit 5 provided for the tool 2a. Then, the user performs the work of attaching fastening members onto the two work targets by using, for example, a tool 2b different from the tool 2a.

(3.1) Registration Mode

First, an exemplary operation of the tool system 1 when a workpiece is assembled will be described with reference to FIG. 3. In this case, the two tools 2a, 2b are supposed to be in an initial state in which none of the image registration processing, the torque registration processing, the information registration processing, or other processing has been performed yet by the registration unit 36. That is to say, in the tools 2a, 2b in the initial state, none of the reference images, target torque values, or processing information corresponding to a first work target TG1 and a second work target TG2, respectively, are stored in the image storage unit 41, the torque storage unit 42, or the information storage unit 45 yet.

First, in response to an operation performed by the user, the tool 2a sets the operation mode at the registration mode (in S1). Next, the user sets the tip portion (i.e., the socket 242) of the tool 2a in place on the first work target TG1 of the workpiece and may turn the trigger switch 221 ON once. In response, the image capturing unit 5 of the tool 2a shoots the first work target TG1 (in S2). Thus, the tool 2a generates a second captured image corresponding to the first work target TG1 and transmits the second captured image to the setting terminal 60 (in S3). Next, the image capturing unit 5 shoots a second work target TG2 in the same way as in the first work target TG1 (in S4). Thus, the tool 2a generates a second captured image corresponding to the second work target TG2 and transmits the second captured image to the setting terminal 60 (in S5).

When the communications unit 61 of the setting terminal 60 receives the second captured images, the output unit 66 of the setting terminal 60 makes the display unit 62 display an on-screen image D1 including any one of the second captured images (in S6).

Figure 4:
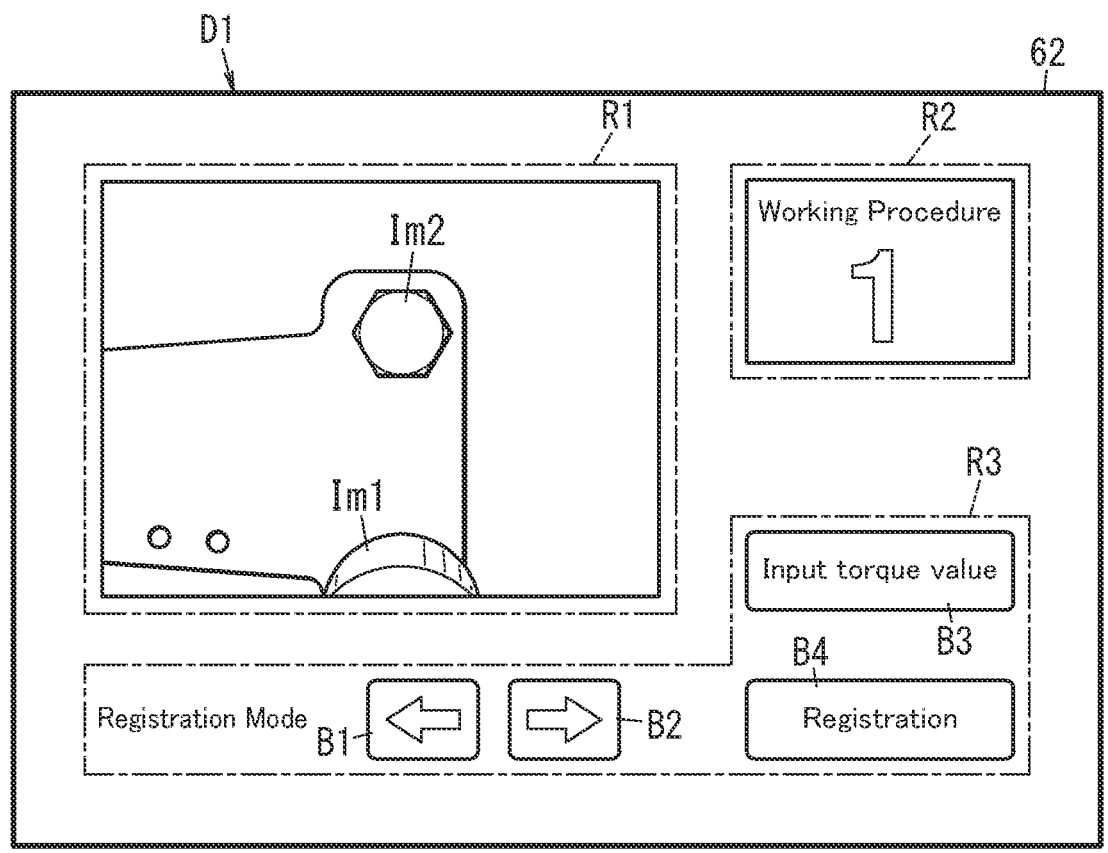
FIG. 4 is a schematic representation illustrating an exemplary on-screen image displayed by the tool system.

FIG. 4 illustrates an exemplary on-screen image D1 displayed on the display unit 62 while the reference image generating unit 67 is generating a reference image based on the second captured images. As used herein, an "on-screen image" such as the on-screen image D1 refers to an image (including a text, a graph, and an icon) displayed on the display unit 62 of the setting terminal 60. Alternatively, the "on-screen image" may also be an image projected by a display device such as a projector onto a screen, for example.

The on-screen image D1 is an image including the second captured image displayed while the reference image generating unit 67 is generating a reference image based on the second captured images. As shown in FIG. 4, the on-screen image D1 includes a first area R1, a second area R2, and a third area R3. The first area R1 is an area where the second captured image is displayed. The second area R2 is an area indicating the place in a certain working process of a work target corresponding to the reference image generated by the reference image generating unit 67. The third area R3 is an area where one or more objects B1-B4 are displayed.

Specifically, the objects B1, B2 are used to change either the second captured images to be displayed in the first area R1 or the working procedure associated with the reference image. The object B3 is used to switch the on-screen image D1 into an on-screen image that allows the user to enter a target torque value for a work target corresponding to the reference image (i.e., second captured image displayed in the first area R1). The object B4 is used to register the reference image that has been generated based on the second captured image in association with a certain work target. The user is allowed to advance, by manipulating these objects B1-B4, the reference image generation processing performed by the reference image generating unit 67.

The user is allowed to determine, by checking the second captured image included in the on-screen image D1 displayed on the display unit 62, whether the second captured image shot by the image capturing unit 5 is suitable for the reference image.

The reference image generating unit 67 generates a reference image by performing predetermined image processing on the second captured image displayed on the display unit 62. The reference image generation processing will be described in detail later in the "(3.3) Reference image generation processing" section.

When a predetermined operation such as manipulating the object B4 is performed by the user, the reference image generating unit 67 finishes the reference image generation processing (in S7). As a result of the work that has been performed so far, a reference image, including two frames respectively corresponding to the two work targets of the workpiece on which the user is performing assembling work, has been stored in the storage unit 65 of the setting terminal 60. In addition, the processing information and target torque value associated with the reference image thus generated are also stored in the storage unit 65 of the setting terminal 60. Furthermore, the reference image, the processing information, and the target torque values are also stored in the storage unit 65 in association with the working procedure of the working process as well.

(3.2) Working Mode

Next, in response to a predetermined operation performed by the user on the operating panel 231 of the tool 2b, the tool 2b sets the operation mode at the working mode (in S8). In this case, the tool 2b is different from the tool 2a provided with the image capturing unit 5 that has shot the second captured images.

At this point in time, a reference image, including a plurality of frames respectively corresponding to the two work targets of the workpiece on which the user is performing assembling work, has not been registered with the tool 2b yet. In response to a predetermined operation performed by the user on the operating panel 231 of the tool 2b, the tool 2b makes the communications unit 26 send the setting terminal 60 a request to transmit a reference image and processing information and target torque values associated with the reference image (in S9). The communications unit 61 of the setting terminal 60 receives the transmission request from the tool 2b. On receiving the transmission request from the tool 2b, the control unit 64 of the setting terminal 60 makes the communications unit 61 transmit the reference image of each work target and the processing information and target torque value data associated with the reference image, which are stored in the storage unit 65, to the tool 2b (in S10). Next, the communications unit 26 of the tool 2b receives the reference image, processing information, and target torque value data of each work target from the setting terminal 60. Then, the registration unit 36 of the control unit 3 performs the processing of registering the reference image, processing information, and target torque value of each work target (in S11). When this registration processing is finished, the user is ready to perform the assembling work on the workpiece by using the tool 2b.

Next, the user performs, using the tool 2b, work on the respective work targets, namely, the first work target TG1 and the second work target TG2, in this order following the working procedure of the assembling work on a workpiece. First, the user sets the tip portion (i.e., the socket 242) of the tool 2b in place on the first work target TG1 of the workpiece and may turn the trigger switch 221 ON once. In response, the image capturing unit 5 of the tool 2b generates a first captured image corresponding to the first work target TG1. At this time, the reflection processing unit 37 of the tool 2b reflects the processing information on the control of the image capturing unit 5 in accordance with the working procedure. For example, if the work that the user is supposed to perform next is fastening work on the first work target TG1, then the reflection processing unit 37 reflects the processing information associated with the first work target TG1 on the control of the image capturing unit 5. Reflecting, on the control of the image capturing unit 5, information about the image processing such as luminance adjustment that has been performed on the reference image allows the image capturing unit 5 to generate a first captured image to be suitably compared with the reference image.

The identification processing unit 33 performs the image processing of comparing the first captured image generated by the image capturing unit 5 with the reference image stored in the image storage unit 41, thereby identifying the current work target to be the first work target TG1 (in S12). Thus, the driving control unit 31 sets the target torque value associated with the first work target TG1 as the torque setting value (in S13). In addition, the notification control unit 34 control the notification unit 211 to have the notification unit 211 make notification that the current work target on which the tool 2b is currently set in place has been identified to be the first work target TG1.

On confirming, based on the contents of the notification made by the notification unit 211, that the current work target has been identified to be the first work target TG1, the user performs the fastening work of attaching a fastening member onto the first work target TG1 (in S14).

The decision unit 35 determines whether the fastening torque when the fastening member is attached to the first work target TG1 is a normal one. Then, the decision unit 35 transmits this decision result (first decision result) to the setting terminal 60 via the communications unit 26 (in S15). When the communications unit 61 of the setting terminal 60 receives the first decision result from the tool 2b, the control unit 64 makes the storage unit 65 store the first decision result in association with the first work target TG1 (in S16).

In addition, the user also performs the fastening work on the second work target TG2 following the same working procedure as in the first work target TG1.

Specifically, the user sets the tip portion (i.e., the socket 242) of the tool 2b in place on the second work target TG2 and may turn the trigger switch 221 ON once. In response, the image capturing unit 5 shoots a first captured image corresponding to the second work target TG2. At this time, the reflection processing unit 37 of the tool 2b reflects the processing information on the control of the image capturing unit 5 in accordance with the working procedure. Then, the identification processing unit 33 performs the image processing, thereby identifying the current work target to be the second work target TG2 (in S17). Thus, the driving control unit 31 sets the target torque value associated with the second work target TG2 as the torque setting value (in S18). In addition, the notification control unit 34 controls the notification unit 211 to have the notification unit 211 make notification that the current work target on which the tool 2b is currently set in place has been identified to be the second work target TG2. On confirming, based on the contents of the notification made by the notification unit 211, that the current work target has been identified to be the second work target TG2, the user performs the fastening work of attaching a fastening member onto the second work target TG2 (in S19). The decision unit 35 determines whether the fastening torque used in the fastening work in Step S19 is a normal one. Then, the decision unit 35 transmits this decision result (second decision result) to the setting terminal 60 via the communications unit 26 (in S20). When the communications unit 61 of the setting terminal 60 receives the second decision result from the tool 2b, the control unit 64 makes the storage unit 65 store the second decision result in association with the second work target TG2 (in S21).

After the user has performed, using the tool 2b, the assembling work on the first work target TG1 and the second work target TG2 of one workpiece in this manner, the user will perform the assembling work in the same way on the other workpieces with the operation mode of the tool 2b set at the working mode.

Note that the sequence chart shown in FIG. 3 shows just an exemplary operation of the tool system 1. Thus, the processing steps shown in FIG. 3 may be performed in a different order as appropriate, an additional processing step may be performed as needed, or at least one of the processing steps may be omitted as appropriate.

(3.3) Reference Image Generation Processing

Next, it will be described in further detail with reference to FIGS. 4-7 how the reference image generating unit 67 performs the processing of generating the reference image.

As described above, while the reference image generating unit 67 is generating a reference image based on the second captured images, the output unit 66 makes the display unit 62 display the on-screen image D1. In the example shown in FIG. 4, a second captured image corresponding to the first work target TG1 is displayed in the first area R1 of the on-screen image D1. The image Im1 of the second captured image is an image of the socket 242 that is currently set in place on the first work target TG1. The image Im2 of the second captured image is an image of the second work target TG2.

The reference image generating unit 67 performs predetermined image processing in accordance with the operating command that has been entered by the user by operating the operating panel. That is to say, the user is allowed to make the reference image generating unit 67 perform predetermined image processing by performing an operation on the on-screen image D1 while checking the second captured image displayed on the display unit 62. For example, if the user finds the second captured image (reference image) displayed on the display unit 62 relatively dark as a whole (i.e., if he or she finds its luminance low), then he or she may have a reference image, brighter than the original second captured image, generated by making the reference image generating unit 67 make luminance adjustment of increasing the luminance.

Optionally, the user may also make, by performing a predetermined operation such as dragging or pinching out on the on-screen image D1, the reference image generating unit 67 perform predetermined image processing involving at least one of cropping or masking.

Figure 5:
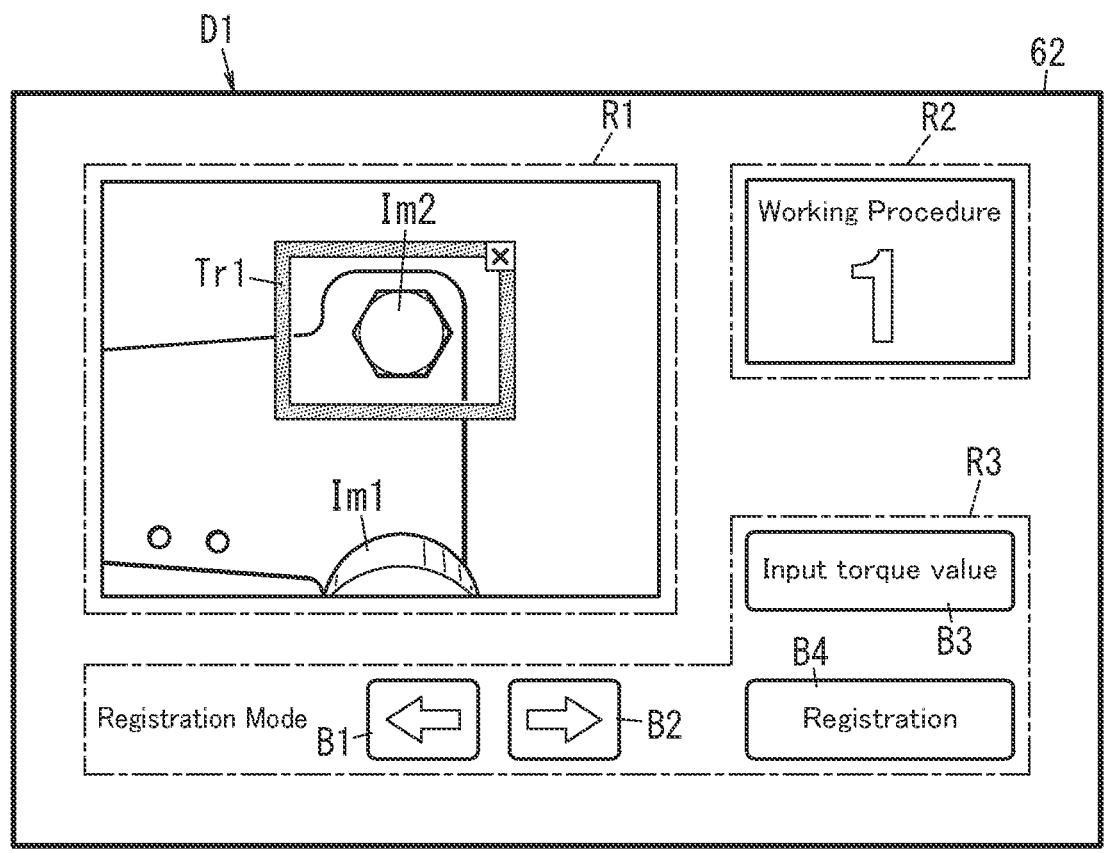
FIG. 5 is a schematic representation illustrating an exemplary situation where a cropping area is set on the on-screen image displayed by the tool system.

FIG. 5 illustrates an exemplary situation where a part of the reference image has been defined to be a cropping area (i.e., the area surrounded with a rectangle Tr1) in response to the predetermined operation performed by the user on the on-screen image D1. Once a reference image has been generated by setting the cropping area, the rest of the reference image, other than the cropping area, is not to be compared with the first captured image. In the example shown in FIG. 5, only the cropping area, surrounded with the rectangle Tr1, of the reference image displayed in the first area R1 is to be compared with the first captured image.

The reference image, for which the cropping area has been set, is stored in the storage unit 65 along with additional information including information about the coordinates of the cropping area in the entire reference image. Such additional information is used when the identification processing unit 33 compares the first captured image with the reference image that has been subjected to cropping. That is to say, while identifying the current work target, the identification processing unit 33 regards, in accordance with the coordinate information included in the additional information, a part of the first captured image as an area to be compared with the cropping area. In this case, each of the first captured image and the second captured image (reference image) is a captured image that has been shot by the image capturing unit 5 with the tool 2 set in place on a work target. Thus, the coordinates of that part of the first captured image generally agree with the coordinates of the cropping area in the reference image. Therefore, the identification processing unit 33 defines, in accordance with the coordinate information of the cropping area, a particular area of the first captured image as an area to be compared with the cropping area. As used herein, the "particular area" refers to an area of the first captured image to be subjected to the pattern recognition processing. In this embodiment, an area, having the same set of coordinates as the cropping area, of the first captured image is supposed to be the particular area. Then, the identification processing unit 33 identifies the current work target by comparing the cropping area with the particular area of the first captured image.

The identification processing unit 33 decides, if the result of the pattern recognition processing indicates that the degree of resemblance (i.e., the degree of matching) between the cropping area of the reference image and the particular area of the first captured image is equal to or greater than a predetermined value (threshold value), that the reference image agree with the first captured image. On the other hand, if the degree of resemblance between the cropping area of the reference image and the particular area of the first captured image less than the predetermined value (threshold value), then the identification processing unit 33 decides that the reference image disagree with the first captured image.

Also, the additional information is information that allows the cropping area to be moved and/or rotated with respect to the first captured image when the identification processing unit 33 compares the cropping area and the first captured image with each other. The additional information also includes coordinate information about an area surrounding (or located near) the cropping area. This allows the identification processing unit 33 to define, in accordance with the coordinate information of the area surrounding the cropping area, the particular area of the first captured image to be an area broader than the cropping area. In this embodiment, an area, of which the set of coordinates agree with the set of coordinates of the cropping area and the set of coordinates of the area surrounding (near) the cropping area (i.e., the set of coordinates of the coordinate information included in the additional information), is defined to be the particular area. Then, the identification processing unit 33 may perform pattern recognition processing in which the cropping area is moved and/or rotated with respect to the first captured image within the particular area of the first captured image. This enables, even if the first captured image and the reference image have been shot from slightly different positions, for example, identifying the current work target accurately.

In addition, the additional information defines at least one of a range in which the cropping area is movable with respect to the first captured image or a range in which the cropping area is rotatable with respect to the first captured image. That is to say, the range in which the cropping area may be moved and/or rotated with respect to the first captured image is limited within the particular area of the first captured image as defined by the coordinate information of the additional information. Limiting the movable and rotatable ranges of the cropping area may lighten the load of the pattern recognition processing placed on the identification processing unit 33.

Figure 6:
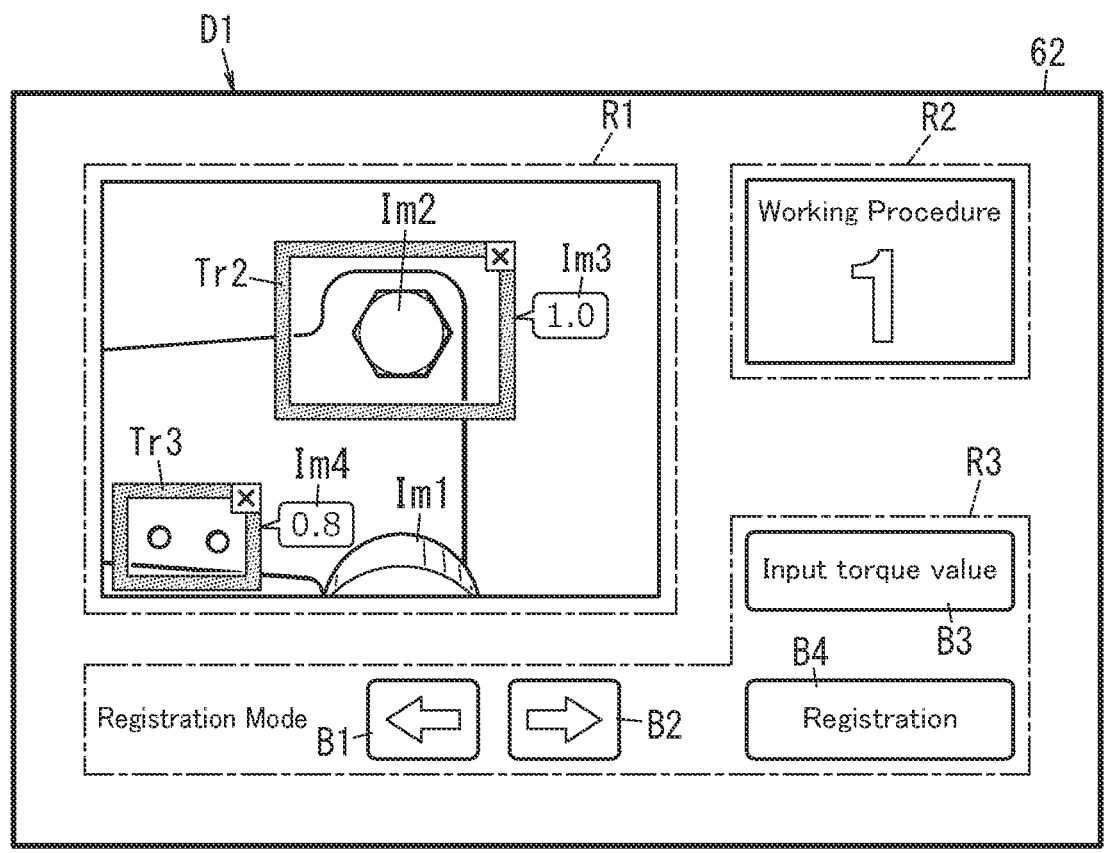
FIG. 6 is a schematic representation illustrating an exemplary situation where a plurality of cropping areas are set on the on-screen image displayed by the tool system.

Optionally, the reference image generating unit 67 may set a plurality of cropping areas with respect to the second captured image (reference image) displayed on the display unit 62. FIG. 6 illustrates a situation where a plurality of cropping areas (namely, an area surrounded with a rectangle Tr2, and an area surrounded with a rectangle Tr3) have been set on the reference image in response to a predetermined operation performed by the user on the on-screen image D1.

When setting a plurality of cropping areas with respect to the reference image, the reference image generating unit 67 may weight each of the plurality of cropping areas. In FIG. 6, the image Im3 indicates the weight of the cropping area surrounded with the rectangle Tr2 and the image Im4 indicates the weight of the cropping area surrounded with the rectangle Tr3. As used herein, the "weight" indicates to what degree each cropping area contributes to the identification of the current work target by the identification processing unit 33. In this embodiment, while the identification processing unit 33 is identifying the current work target, the cropping area with the heavier weight contributes more significantly to the identification of the current work target than the cropping area with the lighter weight. In this embodiment, the identification processing unit 33 calculates the scores on a cropping area basis by multiplying the degree of resemblance between each cropping area and the first captured image by the weight of the cropping area. Furthermore, the identification processing unit 33 adds together the respective scores of the plurality of cropping areas. When finding the total score equal to or greater than a predetermined score, the identification processing unit 33 decides that the first captured image and the reference image agree with each other.

Figure 7:
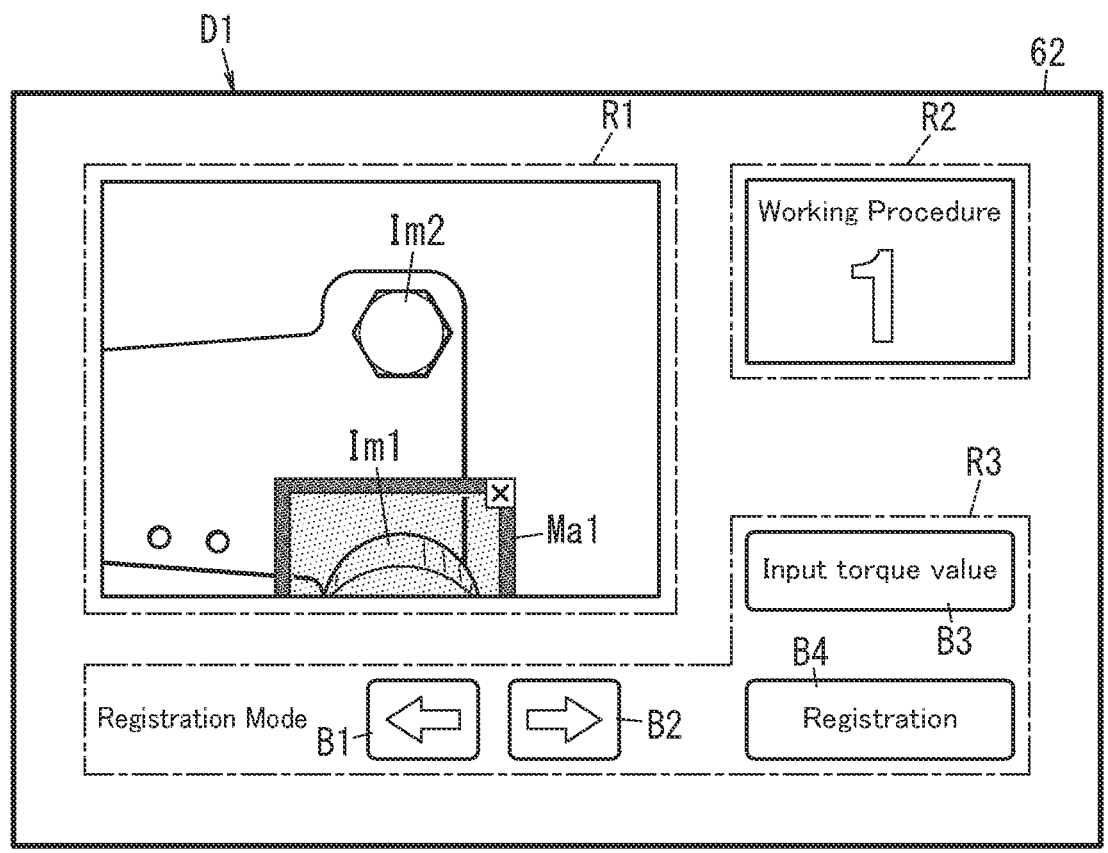
FIG. 7 is a schematic representation illustrating an exemplary situation where a masking area is set on the on-screen image displayed by the tool system.

FIG. 7 illustrates an exemplary situation where a part of the reference image has been defined to be a masking area (i.e., the hatched area surrounded with the rectangle Ma1) in response to a predetermined operation performed by the user on the on-screen image D1. When the reference image is generated by setting the masking area, the rest of the reference image other than then masking area is to be compared with the first captured image. In the example shown in FIG. 7, the rest of the reference image displayed on the first area R1, other than the masking area surrounded with the rectangle Ma1, is to be compared with the first captured image.

Setting the masking area enables removing an unnecessary image area, in which some body part of the user, the light cast from the lighting fixture, or any other unwanted matter is reflected on the surface of the workpiece on which the user is performing assembling work, from the image to compare. In particular, the tool system 1 according to this embodiment makes the image capturing unit 5 provided for the tool 2 generate the second captured image (reference image), and therefore, the tip portion of the tool 2 (i.e., the socket 242), for example, is often shot as a part of the reference image. In this case, if some part (such as a screwdriver bit) which looks differently depending on the stop angle is attached to the tip of the tool 2, then the image of the screwdriver bit shot as a part of the reference image may be different from the image of the screwdriver bit shot as a part of the first captured image. Setting the tip portion of the tool 2 as a masking area in such a situation allows the identification processing unit 33 to identify the current work target more accurately. That is to say, setting the masking area allows the reference image generating unit 67 to generate a reference image that is more suitable for identifying the current work target.

The reference image for which the masking area has been set, as well as the reference image for which the cropping area has been set, is also stored in the storage unit 65 along with additional information that is coordinate information about the masking area in the entire reference image.

(4) Variations

Note that the exemplary embodiment described above is only an exemplary one of various embodiments of the present disclosure and should not be construed as limiting. Rather, the exemplary embodiment may be readily modified in various manners depending on a design choice or any other factor without departing from the scope of the present disclosure. The drawings to be referred to in this description are all schematic representations. Thus, the ratio of the dimensions (including thicknesses) of respective constituent elements illustrated on the drawings does not always reflect their actual dimensional ratio. Also, the functions of the tool system 1 according to the exemplary embodiment may also be implemented as a method for generating a reference image, a (computer) program, or a non-transitory storage medium that stores the program thereon. A method for generating a reference image according to an aspect includes a reference image generating step. The reference image generating step includes generating, based on a second captured image, a reference image to be compared with a first captured image while a current work target, on which a first one 2*b* of a plurality of tools 2*a*, 2*b* is currently set in place, is being identified. Each of the plurality of tools 2*a*, 2*b* is a portable tool and includes: a driving unit 24 to be activated with power supplied from a power source; and an image capturing unit 5. The first captured image is shot, while the current work target is being identified, by the image capturing unit 5 of the first tool 2*b* that is currently set in place among the plurality of tools 2*a*, 2*b*. The second captured image is shot by the image capturing unit 5 of a second one 2*a* of the plurality of tools 2*a*, 2*b*. The reference image generating step further includes a display step. The display step includes making a display unit 62 display the second captured image while the reference image is being generated. A program according to another aspect is designed to cause one or more processors to perform the method for generating the reference image described above.

Next, variations of the exemplary embodiment will be enumerated one after another. Note that the variations to be described below may be adopted as appropriate in combination. In the following description, any constituent element, having the same function as a counterpart of the exemplary embodiment described above, will be designated by the same reference numeral as that counterpart's, and description thereof will be omitted as appropriate herein.

In the embodiment described above, when comparing the cropping area with the first captured image, the identification processing unit 33 compares, in accordance with the coordinate information of the cropping area, a particular area of the first captured image with the cropping area. However, this is only an example and should not be construed as limiting. Alternatively, the identification processing unit 33 may perform pattern recognition processing using the cropping area on the entire first captured image without using the coordinate information of the cropping area.

Also, in the embodiment described above, the identification processing unit 33 adds together the scores of the plurality of cropping areas, and decides, when finding the total score equal to or greater than a predetermined score, that the first captured image and the reference image agree with each other. However, this is only an example and should not be construed as limiting. Alternatively, the identification processing unit 33 may also decide, when finding the score of any one of the plurality of cropping areas equal to or greater than a predetermined score, that the first captured image and the reference image agree with each other.

Furthermore, in the embodiment described above, the identification processing unit 33 calculates the scores on a cropping area basis by multiplying the degree of resemblance between each cropping area and the first captured image by the weight of the cropping area. However, this is only an example and should not be construed as limiting. Alternatively, the identification processing unit 33 may also calculate the scores on a cropping area basis by performing some other type of arithmetic operation that makes the weight related to the degree of resemblance (e.g., by adding a weight to the degree of resemblance between each cropping area and the first captured image).

Furthermore, in the embodiment described above, the reflection processing unit 37 reflects, in the working mode, the processing information on the control of the image capturing unit 5 following the working procedure. However, this is only an example and should not be construed as limiting. Alternatively, the reflection processing unit 37 may also reflect the processing information on the control of the image capturing unit 5 irrespective of the working procedure. For example, if the reference image has been generated by making the reference image generating unit 67 make luminance adjustment, then the reflection processing unit 37 may reflect information about the luminance adjustment on the control of the image capturing unit 5 irrespective of the working procedure.

The tool system 1 according to the present disclosure includes a computer system in the control unit 3 and setting terminal 60 thereof, for example. The computer system may include, as principal hardware components, a processor and a memory. The functions of the tool system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC and an LSI include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, at least some functions of the tool system 1 are aggregated together in a single housing (body 20). However, this is not an essential configuration for the tool system 1. Alternatively, those constituent elements of the tool system 1 may be distributed in multiple different housings. For example, some functions of the control unit 3 may be provided in a housing provided separately from the body 20 of the tool 2. Still alternatively, at least some functions of the control unit 3, for example, may be implemented as a server or a cloud computing system as well.

Note that the tool system 1 does not have to be applied to the assembly line, on which workpieces are assembled at a factory, but may find any other application as well.

In the first embodiment described above, the tool 2 is an impact wrench. However, the tool 2 does not have to be an impact wrench but may also be a nut runner or an oil pulse wrench, for example. Alternatively, the tool 2 may also be a screwdriver (including an impact screwdriver) for use to fasten screws (as fastening members), for example. In that case, a bit (such as a screwdriver bit) is attached to the tool 2 instead of the socket 242. Furthermore, the tool 2 does not have to be configured to be powered by the battery pack 201 but may also be configured to be powered by an AC power supply (commercial power supply). Moreover, the tool 2 does not have to be an electric tool but may also be an air tool including an air motor (driving unit) to be operated by compressed air (power) supplied from an air compressor (power source).

Also, in the exemplary embodiment described above, the work target is supposed to be each of a plurality of portions to be fastened in a single workpiece. However, this is only an example and should not be construed as limiting. Alternatively, the work target may also be a module, part, or product with a plurality of portions to be fastened. In that case, the plurality of portions to be fastened of a single work target may have either the same target torque value or mutually different target torque values.

Alternatively, there may be only one work target. Furthermore, the reference image may be only one frame corresponding to a single work target.

Furthermore, in the embodiment described above, the image storage unit 41 of the tool 2 stores a reference image including a plurality of frames respectively corresponding to a plurality of work targets. However, the tool 2 does not have to store such a reference image including a plurality of frames respectively corresponding to a plurality of work targets. Alternatively, either the setting terminal 60 or the server device may include an image storage unit that stores such a reference image including a plurality of frames respectively corresponding to a plurality of work targets. In that case, the identification processing unit 33 of the tool 2 may access the image storage unit of the setting terminal 60 or the server device to perform the processing of comparing the first captured image shot by the image capturing unit 5 with the reference image stored in the image storage unit and thereby identifying the current work target. Furthermore, the tool 2 does not have to include the identification processing unit 33, either. Alternatively, either the setting terminal 60 or the server device may perform the function of the identification processing unit 33. When the tool 2 outputs a first captured image shot by the image capturing unit 5 to either the setting terminal 60 or the server device, the processing unit of the setting terminal 60 or the server device performs image processing of comparing the first captured image with the reference image and output the result of identification of the current work target to the tool 2.

Optionally, the tool 2 may include a torque sensor for measuring the fastening torque. In that case, the driving control unit 31 controls the driving unit 24 such that the fastening torque measured by the torque sensor becomes the torque setting. Furthermore, the decision unit 35 may determine, by comparing the result of measurement by the torque sensor with the target torque value, whether or not the fastening torque is normal. When finding the result of measurement by the torque sensor falling within a predetermined range based on the target torque value, the decision unit 35 decides that the fastening torque should be a normal one. On the other hand, when finding the result of measurement by the torque sensor falling outside of the predetermined range based on the target torque value, the decision unit 35 decides that the fastening torque should be an insufficient (abnormal) one.

Furthermore, the notification unit 211 does not have to be a light-emitting unit such as an LED but may also be implemented as an image display device such as a liquid crystal display or an organic electroluminescent (EL) display. Optionally, the notification unit 211 may make notification (presentation) by any means other than displaying. For example, the notification unit 211 may also be implemented as a loudspeaker or a buzzer that emits a sound (including a voice). In that case, the notification control unit 34 preferably makes the notification unit 211 emit different sounds in a situation where the decision made by the identification processing unit 33 indicates disagreement and in a situation where the identification processing unit 33 has identified the current work target. Still alternatively, the notification unit 211 may also be implemented as a vibrator that produces vibration or a transmitter for transmitting a notification signal to an external terminal (such as a mobile communications device) provided outside of the tool 2. Optionally, the notification unit 211 may also have, in combination, two or more functions selected from displaying, emitting a sound, producing vibration, and establishing communication.

The storage unit 4 may store working procedure data indicating a predetermined order in which working process steps are to be performed on a plurality of work targets. In that case, the identification processing unit 33 selects, in accordance with the working procedure, a reference image frame for use in image processing (pattern recognition processing) out of the reference image including a plurality of frames. Specifically, the identification processing unit 33 preferentially selects one reference image frame, corresponding to a forthcoming work target to be processed in a forthcoming working process step, out of the plurality of reference image frames. As used herein, the "forthcoming work target" is a work target to be processed next to the work target that has been identified last time. The identification processing unit 33 performs image processing of comparing the reference image selected as template data with the first captured image. That is to say, the identification processing unit 33 selects the reference image by predicting the work target to be shot in the first captured image next time in accordance with the working procedure. This allows the identification processing unit 33 to identify, in a shorter time, the work target shot in the first captured image.

Optionally, the identification processing unit 33 may also be configured to determine the type of the socket 242 attached to the tool 2 by performing image processing on the first captured image. As used herein, the "type" is a piece of information for distinguishing different parts from each other and includes at least one piece of information about the size (dimension or length), shape, or material. In this embodiment, the identification processing unit 33 is configured to determine the length of the socket 242 attached to the tool 2. The identification processing unit 33 corrects, according to the length of the socket 242, the target torque value and sets the target torque value thus corrected as the torque setting. For example, the identification processing unit 33 corrects a target torque value associated with the current work target by multiplying the target torque value by a coefficient corresponding to the length of the socket 242 and sets the target torque value thus corrected as the torque setting. That is to say, the identification processing unit 33 controls the driving unit 24 such that the fastening torque becomes equal to the corrected target torque value. This may reduce dispersion in fastening torque according to the length of the socket 242.

Alternatively, the identification processing unit 33 may also be configured to determine the torque setting according to the detected length (or type) of the socket 242. In the storage unit 4, stored are torque values corresponding one to one to various lengths of the sockets 242. The identification processing unit 33 acquires, from the storage unit 4, a torque value corresponding to the determined length of the socket 242 and sets a value, based on the torque value thus acquired, as the torque setting. For example, the identification processing unit 33 may set the torque value, acquired from the storage unit 4, as the torque setting. This allows the fastening work to be performed at a torque value corresponding to the type of the given socket 242.

In the exemplary embodiment described above, the identification processing unit 33 identifies the current work target by performing the pattern recognition processing. However, the pattern recognition processing is only exemplary processing that enables the identification processing unit 33 to identify the current work target. Alternatively, the identification processing unit 33 may also identify the current work target by either determining the correspondence between the first captured image and the reference image or performing any of various types of image processing for searching for a reference image corresponding to the first captured image instead of the pattern recognition processing.

Furthermore, the image capturing unit 5 does not have to be provided for the barrel 21 of the body 20 but may be provided for the attachment 23 of the body 20 or the battery pack 201, for example. Likewise, the arrangement of the control unit 3, the storage unit 4, and other units may also be changed as appropriate.

Note that the setting terminal 60 does not have to be a mobile communications device that the user may carry with him or her. Alternatively, the setting terminal 60 may also be, for example, a server that may communicate with the communications unit 26 of the tool 2.

The tool system 1 only needs to include at least the reference image generating unit 67 and the output unit 66. That is to say, the tool 2 is not an essential constituent element for the tool system 1. Also, in the exemplary embodiment described above, the tool system 1 is implemented as a single system including the reference image generating unit 67 and the output unit 66. Alternatively, the tool system 1 may also be implemented as two or more systems. For example, the functions of the reference image generating unit 67 and the output unit 66 may be distributed in two or more systems. Also, at least one function of the reference image generating unit 67 or the output unit 66 may be distributed in two or more systems. For example, the function of the reference image generating unit 67 may be distributed in two or more devices. Optionally, at least some functions of the tool system 1 may be implemented as a cloud computing system as well.

Recapitulation

As can be seen from the foregoing description, a tool system (1) according to a first aspect is used for a plurality of tools (2a, 2b). Each of the plurality of tools (2a, 2b) is a portable tool and includes: a driving unit (24) to be activated with power supplied from a power source; and an image capturing unit (5). The tool system (1) includes a reference image generating unit (67). The reference image generating unit (67) generates a reference image to be compared with a first captured image. The first captured image is shot, while a current work target, on which a first tool (2a; 2b) that is one of the plurality of tools (2a, 2b) is currently set in place, is being identified among a plurality of work targets, by the image capturing unit (5) of the first tool (2a; 2b) that is currently set in place among the plurality of tools (2a, 2b). The reference image generating unit (67) generates the reference image based on a second captured image. The second captured image is to be shot by the image capturing unit (5) of a second tool (2a; 2b) that is one of the plurality of tools (2a, 2b). The tool system (1) further includes an output unit (66). The output unit (66) makes a display unit (62) display the second captured image while the reference image generating unit (67) is generating the reference image.

This aspect allows the user to check the second captured image while the reference image is being generated, thus enabling using, as a reference image, an image that is more suitable for identifying the current work target.

In a tool system (1) according to a second aspect, which may be implemented in conjunction with the first aspect, the display unit (62) is provided separately from the plurality of tools (2a, 2b).

According to this aspect, none of the plurality of tools (2a, 2b) includes the display unit (62), thus enabling reducing the size of the plurality of tools (2a, 2b) and thereby improving the workability of the plurality of tools (2a, 2b).

A tool system (1) according to a third aspect, which may be implemented in conjunction with the second aspect, further includes a communications unit (61) that is ready to communicate with each of the plurality of tools (2a; 2b) via at least one of wired communication or wireless communication. The communications unit (61) receives the second captured image from the second tool (2a, 2b). The output unit (66) makes the display unit (62) display the second captured image received by the communications unit (61).

According to this aspect, the output unit (66) makes the display unit (62) display the second captured image received by the communications unit (61). Thus, there is no need to relocate the second captured image that the output unit (66) makes the display unit (62) display via a storage medium such as a USB memory.

In a tool system (1) according to a fourth aspect, which may be implemented in conjunction with any one of the first to third aspects, the reference image generating unit (67) generates the reference image by performing predetermined image processing on the second captured image displayed on the display unit (62).

According to this aspect, the image generated by performing predetermined image processing on the second captured image displayed on the display unit (62) is used as the reference image, thus enabling using, as a reference image, an image that is more suitable for identifying the current work target.

In a tool system (1) according to a fifth aspect, which may be implemented in conjunction with the fourth aspect, the reference image generating unit (67) performs the predetermined image processing in accordance with an operating command entered by a user.

According to this aspect, the image generated by subjecting the second captured image displayed on the display unit (62) to the predetermined image processing in accordance with an operating command entered by the user is used as the reference image, thus enabling using, as a reference image, an image that is more suitable for identifying the current work target.

In a tool system (1) according to a sixth aspect, which may be implemented in conjunction with the fourth or fifth aspect, the reference image includes a plurality of frames corresponding to either a single work target or a plurality of work targets. The reference image generating unit (67) may change specifics of the predetermined image processing on a frame-by-frame basis when generating the reference image including the plurality of frames.

According to this aspect, the reference image generating unit (67) changes specifics of the predetermined image processing on a frame-by-frame basis when generating the reference image including the plurality of frames, thus enabling performing suitable predetermined image processing on a frame-by-frame basis.

In a tool system (1) according to a seventh aspect, which may be implemented in conjunction with any one of the fourth to sixth aspects, the predetermined image processing involves at least one of a cropping process or a masking process. The cropping process includes setting a cropping area to be compared while the current work target is being identified. The masking process includes setting a masking area not to be compared while the current work target is being identified.

According to this aspect, the second captured image displayed on the display unit (62) is subjected to predetermined image processing involving at least one of a cropping process or a masking process. This allows the tool system (1) to compare an image area, suitable for identifying the current work target, of the second captured image with the first captured image.

In a tool system (1) according to an eighth aspect, which may be implemented in conjunction with the seventh aspect, the reference image generated by the cropping process has been provided with additional information. The additional information is information that enables the cropping area to be moved and/or rotated with respect to the first captured image while the cropping area is being compared with a part of the first captured image.

According to this aspect, the tool system (1) moves and/or rotates the cropping area with respect to the first captured image when comparing a part of the first captured image with the cropping area. Thus, the tool system (1) enables further improving the accuracy with which the current work target is identified.

In a tool system (1) according to a ninth aspect, which may be implemented in conjunction with the eighth aspect, the additional information defines at least one of a range in which the cropping area is movable with respect to the first captured image or a range in which the cropping area is rotatable with respect to the first captured image.

According to this aspect, the cropping area is moved and/or rotated within the range defined by the additional information, thus lightening the processing load while the tool system (1) is identifying the current work target.

In a tool system (1) according to a tenth aspect, which may be implemented in conjunction with any one of the seventh to ninth aspects, the predetermined image processing includes the cropping process. The reference image generating unit (67) may set a plurality of cropping areas with respect to the second captured image displayed on the display unit (62). The reference image generating unit (67) may weight each of the plurality of cropping areas.

According to this aspect, the reference image generating unit (67) is allowed to set a plurality of cropping areas and weight each of the plurality of cropping areas, thus enabling generating a reference image that is more suitable for identifying the current work target.

A tool system (1) according to an eleventh aspect, which may be implemented in conjunction with any one of the fourth to tenth aspects, further includes a reflection processing unit (37). The reflection processing unit (37) reflects information about the predetermined image processing on control of the image capturing unit (5).

According to this aspect, information about the predetermined image processing performed while the reference image is being generated is reflected on the control of the image capturing unit (5), thus allowing the image capturing unit (5) to shoot a first captured image to be suitably compared with the reference image.

Note that the constituent elements according to the second to eleventh aspects are not essential constituent elements for the tool system (1) but may be omitted as appropriate.

A tool (2a; 2b) according to a twelfth aspect is to be used in the tool system (1) according to any one of the first to eleventh aspects and includes the driving unit (24) and the image capturing unit (5).

According to this aspect, while the reference image is being generated, a second captured image is displayed on the display unit (62). This allows the user to check the second captured image while the reference image is being generated.

A method for generating a reference image according to a thirteenth aspect includes a reference image generating step. The reference image generating step includes generating, based on a second captured image, a reference image to be compared with a first captured image while a current work target, on which a first tool that is one of a plurality of tools (2a, 2b) is currently set in place, is being identified. The first captured image is shot, while the current work target, on which the first tool (2a; 2b) is currently set in place, is being identified, by an image capturing unit (5) of the first tool (2a; 2b) that is currently set in place among the plurality of tools (2a, 2b). Each of the plurality of tools (2a, 2b) is a portable tool and includes: a driving unit (24) to be activated with power supplied from a power source; and the image capturing unit (5). The second captured image is shot by the image capturing unit (5) of a second tool that is one of the plurality of tools (2a, 2b). The reference image generating step further includes a display step. The display step includes making a display unit (62) display the second captured image while the reference image is being generated.

According to this aspect, while the reference image is being generated, a second captured image is displayed on the display unit (62). This allows the user to check the second captured image while the reference image is being generated.

A program according to a fourteenth aspect is designed to cause one or more processors to perform the method according to the thirteenth aspect.

According to this aspect, while the reference image is being generated, a second captured image is displayed on the display unit (62). This allows the user to check the second captured image while the reference image is being generated.

A tool system (1) according to a fifteenth aspect includes a plurality of tools (2a, 2b), a reference image generating unit (67), and an output unit (66). Each of the plurality of tools (2a, 2b) is a portable tool and includes: a driving unit (24) to be activated with power supplied from a power source; and an image capturing unit (5). The reference image generating unit (67) generates a reference image to be compared with a first captured image. The first captured image is shot, while a current work target, on which a first tool (2a; 2b) that is one of the plurality of tools (2a, 2b) is currently set in place, is being identified among a plurality of work targets, by the image capturing unit (5) of the first tool (2a; 2b) that is currently set in place among the plurality of tools (2a, 2b). The reference image generating unit (67) generates the reference image based on a second captured image. The second captured image is shot by the image capturing unit (5) of a second tool (2a; 2b) that is one of the plurality of tools (2a, 2b). The output unit (66) makes a display unit (62) display the second captured image while the reference image generating unit (67) is generating the reference image.

According to this aspect, while the reference image is being generated, the user is allowed to check a second captured image, thus enabling using, as the reference image, an image that is more suitable for identifying the current work target.

REFERENCE SIGNS LIST

1 Tool System
2, 2a, 2b Tool
24 Driving Unit
37 Reflection Processing Unit
5 Image Capturing Unit
60 Setting Terminal
61 Communications Unit
62 Display Unit
66 Output Unit
67 Reference Image Generating Unit

The invention claimed is:

1. A method for generating a reference image, the method comprising:
a reference image generating step including generating a reference image to be compared with a first captured image, the first captured image being shot by an image capturing unit of a first tool while a current work target on which the first tool is currently set in place is being identified among a plurality of work targets, wherein the reference image is based on a second captured image shot by an image capturing unit of a second tool, wherein the first tool and the second tool are each one of a plurality of tools, and wherein each of the plurality of tools is portable and each of the plurality of tools includes: a driving unit configured to be activated with power supplied from a power source and an image capturing unit,
the reference image generating step further comprising a display step including making a display unit display the second captured image while the reference image is being generated,
the reference image generating step including generating the reference image by performing predetermined image processing on the second captured image displayed on the display unit, and
the predetermined image processing involves a cropping process including setting a cropping area of the second captured image to be compared to the first captured image while the current work target is being identified.

2. A non-transitory storage medium storing thereon a program designed to cause one or more processors to perform the method of claim 1.

3. A tool system comprising:
a plurality of tools, each of the plurality of tools being portable and including: a driving unit configured to be activated with power supplied from a power source; and an image capturing unit; and
a reference image generating unit configured to generate a reference image to be compared with a first captured image, the first captured image being shot by the image capturing unit of a first tool while a current work target on which the first tool is currently set in place is being identified among a plurality of work targets, the first tool being one of the plurality of tools,
the reference image generating unit being configured to generate the reference image based on a second captured image shot by the image capturing unit of a second tool that is one of the plurality of tools,
the tool system further comprising an output unit configured to make a display unit display the second captured image while the reference image generating unit is generating the reference image,
the reference image generating unit being configured to generate the reference image by performing predetermined image processing on the second captured image displayed on the display unit, and
the predetermined image processing involves a cropping process including setting a cropping area of the second captured image to be compared to the first captured image while the current work target is being identified.

4. A tool system for use for a plurality of tools, each of the plurality of tools being portable and including: a driving unit configured to be activated with power supplied from a power source; and an image capturing unit, the tool system comprising:
a reference image generating unit configured to generate a reference image to be compared with a first captured image, the first captured image being shot by the image capturing unit of a first tool while a current work target on which the first tool is currently set in place is being identified among a plurality of work targets, the first tool being one of the plurality of tools,
the reference image generating unit being configured to generate the reference image based on a second captured image shot by the image capturing unit of a second tool that is one of the plurality of tools,
the tool system further comprising an output unit configured to make a display unit display the second captured image while the reference image generating unit is generating the reference image,
the reference image generating unit being configured to generate the reference image by performing predetermined image processing on the second captured image displayed on the display unit, and
the predetermined image processing involving a cropping process including setting a cropping area of the second captured image to be compared to the first captured image while the current work target is being identified.

5. The tool system of claim 4, wherein
the display unit is provided separately from the plurality of tools.

6. The tool system of claim 5, further comprising a communications unit configured to be ready to communicate with each of the plurality of tools via at least one of wired communication or wireless communication, wherein
the communications unit is configured to receive the second captured image from the second tool that is one of the plurality of tools, and
the output unit is configured to make the display unit display the second captured image received by the communications unit.

7. The tool system of claim 4, wherein
the reference image generating unit is configured to perform the predetermined image processing in accordance with an operating command entered by a user.

8. The tool system of claim 4, wherein
the reference image includes a plurality of frames corresponding to either a single work target or a plurality of work targets, and the reference image generating unit is able to change specifics of the predetermined image processing on a frame-by-frame basis when generating the reference image including the plurality of frames.

9. The tool system of claim 4, wherein
the predetermined image processing involves a masking process including setting a masking area not to be compared while the current work target is being identified.

10. The tool system of claim 4, wherein
the reference image generated by the cropping process has been provided with additional information, and
the additional information is information that enables the cropping area to be moved and/or rotated with respect to the first captured image while the cropping area is being compared with a part of the first captured image.

11. The tool system of claim 4, wherein
the additional information defines at least one of a range in which the cropping area is movable with respect to the first captured image or a range in which the cropping area is rotatable with respect to the first captured image.

12. The tool system of claim 4, wherein
the predetermined image processing includes the cropping process,
the reference image generating unit is able to set a plurality of cropping areas with respect to the second captured image displayed on the display unit, and
the reference image generating unit is able to weight each of the plurality of cropping areas.

13. The tool system of claim 4, further comprising a reflection processing unit configured to reflect information about the predetermined image processing on control of the image capturing unit.

14. A tool to be used in the tool system of claim 4, the tool comprising:
the driving unit; and
the image capturing unit.

* * * * *